(12) United States Patent
Hirakawa et al.

(10) Patent No.: US 7,633,663 B2
(45) Date of Patent: Dec. 15, 2009

(54) OPTICAL SCANNING DEVICE AND IMAGE FORMING APPARATUS

(75) Inventors: Makoto Hirakawa, Kanagawa (JP); Naoki Miyatake, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 94 days.

(21) Appl. No.: 11/453,842

(22) Filed: Jun. 16, 2006

(65) Prior Publication Data
US 2007/0002417 A1 Jan. 4, 2007

(30) Foreign Application Priority Data
Jun. 29, 2005 (JP) ............................. 2005-189761

(51) Int. Cl.
*G02B 26/08* (2006.01)
(52) U.S. Cl. ............... 359/204.1; 359/207.1; 359/196.1
(58) Field of Classification Search ................. 359/197, 359/206.1, 207.1, 207.2
See application file for complete search history.

(56) References Cited

U.S. PATENT DOCUMENTS

| | | | | |
|---|---|---|---|---|
| 5,025,268 | A * | 6/1991 | Arimoto et al. | 347/259 |
| 5,541,760 | A * | 7/1996 | Iizuka | 359/207 |
| 6,987,593 | B2 | 1/2006 | Hayashi et al. | |
| 6,987,594 | B2 * | 1/2006 | Takayama | 359/205 |
| 2002/0001118 | A1 * | 1/2002 | Nakajima et al. | 359/204 |
| 2002/0131137 | A1 * | 9/2002 | Suzuki | 359/205 |
| 2005/0018268 | A1 * | 1/2005 | Hayashi et al. | 359/205 |

FOREIGN PATENT DOCUMENTS

| | | |
|---|---|---|
| JP | 11-14932 | 1/1999 |
| JP | 11-38348 | 2/1999 |
| JP | 11-64754 | 3/1999 |
| JP | 11-109266 | 4/1999 |
| JP | 2003-5114 | 1/2003 |
| JP | 3450653 | 7/2003 |

(Continued)

OTHER PUBLICATIONS

U.S. Appl. No. 10/803,991, filed Mar. 19, 2004, Tomohiro Nakajima, et al.

(Continued)

*Primary Examiner*—Stephone B Allen
*Assistant Examiner*—Jade R Callaway
(74) *Attorney, Agent, or Firm*—Oblon, Spivak, McClelland, Maier & Neustadt, L.L.P.

(57) ABSTRACT

An optical scanning device includes a light deflector that deflects light beams from a light source device and an optical scanning optical system that focuses the light beams deflected by the light deflector on a surface to be scanned, wherein the light beams are made incident on a deflective reflection surface of the light deflector at an angle in a sub-scanning direction with respect to a normal of the deflective reflection surface. The optical scanning optical system has at least one scanning focus lens, and at least one lens surface of the scanning focus lens is a surface, curvature in the sub-scanning direction of which changes according to an image height, and is a surface, curvature in the sub-scanning direction of which on a reference axis of the lens is zero or substantially zero, in order to effectively correct a scanning line curve and deterioration in a wavefront aberration.

25 Claims, 14 Drawing Sheets

FOREIGN PATENT DOCUMENTS

JP  2004-70109  3/2004

OTHER PUBLICATIONS

U.S. Appl. No. 11/146,106, filed Jun. 7, 2005, Hiromichi Atsuumi, et al.

U.S. Appl. No. 11/857,069, filed Sep. 18, 2007, Hirakawa et al.
U.S. Appl. No. 12/020,292, filed Jan. 25, 2008, Miyatake, et al.
U.S. Appl. No. 12/190,182, filed Aug. 12, 2008, Ichii et al.
U.S. Appl. No. 12/193,902, filed Aug. 19, 2008, Miyatake.

* cited by examiner

LIGHT DEFLECTOR SUB-SCANNING DIRECTION HEIGHT (h): SMALL
ANGLE IN SUB-SCANNING DIRECTION ($\beta$): SMALL LIGHT DEFLECTOR SUB-SCANNING DIRECTION HEIGHT (h): LARGE
ANGLE IN SUB-SCANNING DIRECTION ($\beta$): NONE

EXAMPLE 1: INNER
SIDE LIGHT FLUX

Ast.Z ———
Ast.Y ----
Wid (Z) 2.495
Wid (Y) 0.950

Scan.Z ———
Wid (Z) 0.072

Linear ———
F-Theta ----
Wid (L) 0.708

EXAMPLE 1: OUTER
SIDE LIGHT FLUX
Y=110.0

Ast.Z ———
Ast.Y ----
Wid (Z) 2.042
Wid (Y) 1.162

Scan.Z ———
Wid (Z) 0.159

Linear ———
F-Theta ----
Wid (L) 0.988

EXAMPLE 2: INNER
SIDE LIGHT FLUX

Ast.Z ———
Ast.Y - - - -
Wid (Z) 1.376
Wid (Y) 1.026

Scan.Z ———
Wid (Z) 0.005

Linear ———
F-Theta - - - -
Wid (L) 1.177

EXAMPLE 2: OUTER SIDE LIGHT FLUX

Ast.Z ——
Ast.Y ----
Wid (Z) 1.380
Wid (Y) 2.335

Scan.Z ——
Wid (Z) 0.010

Linear ——
F-Theta ----
Wid (L) 0.952

(PLANE S COINCIDES WITH XZ PLANE AT IMAGE HEIGHT 0)

OPTICAL SCANNING DEVICE AND IMAGE FORMING APPARATUS

CROSS-REFERENCE TO RELATED APPLICATIONS

The present document incorporates by reference the entire contents of Japanese priority document, 2005-189761 filed in Japan on Jun. 29, 2005.

BACKGROUND OF THE INVENTION

1. Field of the Invention

The present invention relates to an optical scanning device and an image forming apparatus of an electrophotographic system like a digital copying machine, a laser printer, a laser plotter, a laser facsimile or a multifunction product including functions of these apparatuses.

2. Description of the Related Art

There is an optical scanning device widely known in relation to image forming apparatuses of the electrophotographic system such as a digital copying machine and a laser printer. In general, the optical scanning device deflects light beams emitted from a light source device with a light deflector, focuses the light beams on a surface to be scanned with an optical scanning optical system, which uses a scanning focus lens like an fθ lens, to form a light spot on the surface to be scanned, and subjects the surface to be scanned to optical scanning (main scanning) using the light spot. The surface to be scanned is essentially a photosensitive surface of a photosensitive medium serving as a photoconductive photosensitive member.

In recent years, color printing using laser printers and digital copying machines has made a great progress. Therefore, an optical scanning device used in these apparatuses is required to form a plurality of scanning lines on a plurality of photosensitive members at a time.

Several methods are conceivable as a system that satisfies such a request. For example, there is a tandem system in which four photosensitive members corresponding to cyan (C), magenta (M), yellow (Y), and black (K) are arranged side by side.

In a color image forming apparatus of the tandem system, the photosensitive members are arranged in a conveying direction of recording paper (or an intermediate transfer member). A light flux of light beams radiated from a plurality of light source devices corresponding to the respective photosensitive members is deflected by one deflecting unit (a light deflector) to scan the photosensitive drums. The respective photosensitive drums are simultaneously exposed to the light flux by a plurality of optical scanning optical systems corresponding to the respective photosensitive members to form latent images. The latent images are visualized by developing devices that use developers of different colors such as cyan (C), magenta (M), yellow (Y), and black (K). The visual images are sequentially transferred onto identical recording paper (or an identical intermediate transfer member) to be superimposed one on top of another. As a result, a color image is obtained.

As an optical scanning optical system for a low-cost optical scanning device suitable for such a color image forming apparatus of the tandem system, there is an oblique incidence optical system. In the oblique incidence optical system, a light beams are made incident on a deflective reflection surface of a light deflector at an angle in a sub-scanning direction with respect to a normal of the deflective reflection surface.

For example, Japanese Patent Application Laid-Open No. 2003-5114 discloses an oblique incidence optical system that makes light beams incident on a deflective reflection surface of a light deflector at an angle in a sub-scanning direction. In an optical scanning device using the oblique incidence optical system, a plurality of light beams made obliquely incident on the deflective reflection surface of the light deflector are deflected and reflected on the deflective reflection surface, respectively. The light beams are separated by a return mirror or the like to be led to surfaces to be scanned (photosensitive members) corresponding to the light beams, respectively. In this case, the angle in the sub-scanning direction of the respective light beams (the angle of oblique incidence on the light deflector) is set to an angle that allows respective light fluxes to be separated by the mirror.

By using the oblique incidence optical system, it is possible to realize intervals of the light beams adjacent to each other in the sub-scanning direction, which allow the respective light fluxes to be separated by the mirror, without increasing a size of the light deflector (e.g., without increasing stages of a polygon mirror in the sub-scanning direction and thickness of the polygon mirror).

However, the oblique incidence optical system has a problem in that a "scanning line curve" is large. An amount of occurrence of the scanning line curve is different depending upon an angle of oblique incidence in the sub-scanning direction of the respective light beams. When latent images drawn by the respective light beams are visualized to be superimposed one on top of another by toners of the respective colors, the amount of occurrence of the scanning line curve appears as color drift. Since the light beams are made obliquely incident on the deflective reflection surface, the light fluxes are made incident on a scanning focus lens in a twisted state. Thus, a wavefront aberration increases. In particular, optical performance is markedly deteriorated at a peripheral image height and a beam spot diameter increases. This prevents improvement of an image quality.

In the oblique incidence optical system, light fluxes from a light source side are made incident toward a rotation axis of the polygon mirror. Thus, when the light source is arranged in a position overlapping an optical axis of the scanning focus lens in a main scanning direction, the angle of oblique incidence is increased to prevent interference with the scanning focus lens.

As a method of correcting the "large scanning line curve" peculiar to the oblique incidence system, a method of including a "lens having a lens surface with an inclination peculiar thereto in a sub-scanning section changed in a main scanning direction to correct a scanning line curve" in a scanning focus optical system is proposed (see, for example, Japanese Patent Application Laid-Open No. H11-14932). A method of including a "correcting reflection surface having a reflection surface with an inclination peculiar thereto in a sub-scanning section changed in a main scanning direction to correct a scanning line curve" in a scanning focus optical system is also proposed (see, for example, Japanese Patent Application Laid-Open No. H11-38348).

In Japanese Patent Application Laid-Open No. 2004-70109, a method of causing light fluxes obliquely made incident to pass outside an axis of a scanning focus lens and aligning positions of scanning lines using a surface for changing a sagittal line of the scanning focus lens along a main scanning direction is proposed. In an example described in the laid-open patent application, correction is performed using one scanning focus lens. Although it is possible to correct the scanning line curve, deterioration in a beam spot diameter due to an increase in wavefront aberration explained below is not described.

Another problem in the oblique incidence system is that large deterioration in a wavefront aberration tends to occur at the peripheral image height (near both ends of scanning lines) because of skew of beams. When such a wavefront aberration occurs, a spot diameter of a light spot increases at the peripheral image height. If it is impossible to solve this problem, it is impossible to realize "optical scanning at high density" strongly demanded recently. In the optical scanning device described in the laid-open patent application, the large scanning line curve peculiar to the oblique incidence system is extremely satisfactorily corrected. However, it cannot be said that correction of the wavefront aberration is sufficient.

As an optical scanning device that can satisfactorily correct the "the scanning line curve and the deterioration in a wavefront aberration", which are the problems of the oblique incidence system, an optical scanning device in which a plurality of rotational asymmetrical lenses are included in a scanning focus optical system and a meridian line shape connecting sagittal line vertexes of lens surfaces of the rotational asymmetrical lenses is curved in a sub-scanning direction is proposed (see Japanese Patent Application Laid-Open No. H10-73778).

However, the problems are solved by curving the meridian line in the lens having the "lens surface on which the meridian line shape connecting the sagittal line vertexes is curved in the sub-scanning direction". Separate scanning focus lenses corresponding to incident light fluxes are required. Thus, when the optical scanning device is applied to the tandem scanning optical system, the number of scanning focus lenses increases.

When two light fluxes traveling to different surfaces to be scanned are made incident on an identical lens, the problems are solved for one light flux by curving a sagittal line shape. However, it is difficult to reduce a scanning line curve and a wavefront aberration for the other light flux.

Since the lens has curvature in the sub-scanning direction, when light fluxes made incident on the lens shift in the sub-scanning direction because of influences of an assembly error, a machining error, environmental fluctuation, and the like, a shape of the scanning line curve is affected by an influence of refracting power of the lens in the sub-scanning direction to change. An effect of color drift control in an initial period (or at the time of design) in a color image is not obtained to cause color drift.

Moreover, in the correction of a wavefront aberration, a change in a skew state of light fluxes is large because of fluctuation in incident light fluxes on a surface having curvature. Thus, it is difficult to stably obtain a satisfactory beam spot diameter.

In the conventional technology described in Japanese Patent Application Laid-Open No. 2003-5114 described above, correction of the scanning line curve is carried out using the same surface as that in the conventional technique described in Japanese Patent Application Laid-Open No. H10-73778. However, in this case, it is also difficult to stably obtain a satisfactory beam spot diameter as explained above.

The present invention has been devised in view of the circumstances. It is an object of the present invention to realize an optical scanning device having a new constitution that is suitable for a reduction in cost, a reduction in power consumption, and a reduction in size and can effectively correct a scanning line curve and deterioration in a wavefront aberration in the optical scanning device of the oblique incidence system. It is another object of the present invention to realize an image forming apparatus having a new constitution that effectively corrects a scanning line curve and deterioration in a wavefront aberration in the optical scanning device of the oblique incidence system and has few color drift occurrence even at the time of a high-speed operation, an increase in density, temperature fluctuation, and the like.

SUMMARY OF THE INVENTION

In order to at least partially solve the problems in the conventional technology, an optical scanning device according to the present invention includes a light deflector that deflects light beams from at least one of a plurality of light source devices and an optical scanning optical system that focuses the light beams deflected by the light deflector on a surface to be scanned, wherein when a direction of scanning by the light deflector is a main scanning direction and a direction orthogonal to the main scanning direction is a sub-scanning direction, the light beams are made incident on a deflective reflection surface of the light deflector at an angle in the sub-scanning direction with respect to a normal of the deflective reflection surface.

According to one aspect of the present invention, the optical scanning device is constructed such that the optical scanning optical system has at least one scanning focus lens and at least one lens surface of the scanning focus lens is a surface, curvature in the sub-scanning direction of which changes according to an image height, and is a surface, curvature in the sub-scanning direction of which on a reference axis of the lens is either one of zero and substantially zero.

According to another aspect of the present invention, the optical scanning device is constructed such that curvature in the sub-scanning direction of a scanning focus lens closest to the light deflector of the optical scanning optical system changes according to an image height such that negative power in the sub-scanning direction in a plane that includes beams and is parallel to the sub-scanning direction increases as the image height increases.

According to still another aspect of the present invention, the optical scanning device is constructed such that curvature in the sub-scanning direction of a scanning focus lens closest to the light deflector of the optical scanning optical system changes according to an image height such that emitted light is farther apart from a reference axis with respect to the sub-scanning direction as the image height increases.

According to still another aspect of the present invention, the optical scanning device is constructed such that a reflection point on the light deflector and an incidence point on a scanning focus lens closest to the light deflector of the optical scanning optical system are present on opposite sides to each other with respect to a plane that includes a reference axis of the scanning focus lens and is orthogonal to a rotation axis of the light deflector.

According to still another aspect of the present invention, a multi-beam optical scanning device includes a multi-beam light source device that emits a plurality of light beams and a light beam scanning unit that focuses the light beams from the multi-beam light source device on a surface to be scanned and scans the surface to be scanned using the light beams, wherein the multi-beam optical scanning device uses as the light beam scanning unit an optical scanning device, which is constructed as any one of the above-mentioned structures.

According to still another aspect of the present invention, an image forming apparatus includes a writing unit that exposes a photosensitive member serving as a surface to be scanned using light beams and writes a latent image on the photosensitive member, wherein the image forming apparatus is provided with a multi-beam optical scanning device which is constructed as mentioned above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1A:
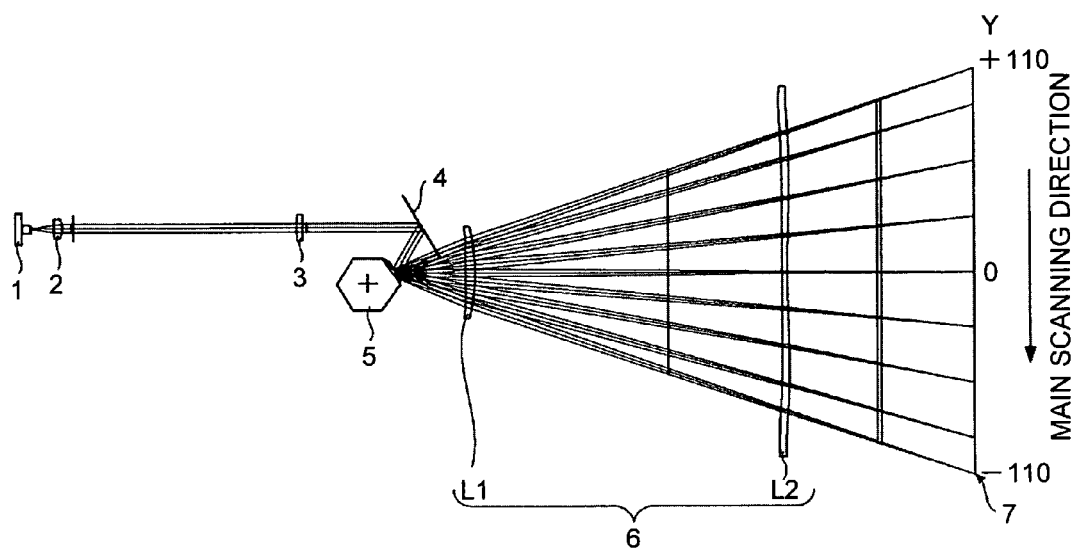
FIGS. 1A and 1B are diagrams for explaining an optical scanning device according to an embodiment of the present invention.
Figure 1B:
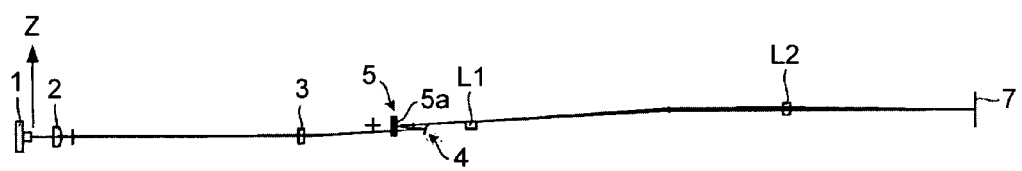

FIGS. 1A and 1B are diagrams for explaining an optical scanning device according to a first embodiment of the present invention. FIG. 1A is an optical system arrangement on a main scanning section (a plane section that includes an optical axis and is parallel to a deflective scanning direction (a main scanning direction) by a light deflector) in which an optical system of the optical scanning device is developed. FIG. 1B is an optical system arrangement on a sub-scanning section (a section that includes an optical axis and is orthogonal to the main scanning section).

Referring to FIGS. 1A and 1B, divergent light fluxes emitted from a semiconductor laser 1 serving as a light source device are converted into a light flux form suitable for the following optical systems by a coupling lens 2. The light flux form converted by the coupling lens 2 may be parallel light fluxes or may be weakly divergent or weakly convergent light fluxes.

The light fluxes from the coupling lens 2 are focused in the sub-scanning direction by a first optical system 3 like a cylindrical lens and returned on an optical path by a return mirror 4 to be made incident on a deflective reflection surface 5a of a light deflector (e.g., a polygon mirror (a rotary polygon mirror) rotated at uniform velocity by a motor) 5. As shown in FIG. 1B, the light fluxes from the light source side are made obliquely incident on a main scanning plane orthogonal to a rotation axis of the deflective reflection surface 5a of the light deflector 5. In other words, light beams from the light source device 1 are made incident on the deflective reflection surface 5a of the light deflector 5 at an angle in the sub-scanning direction with respect to a normal of the deflective reflection surface 5a. Therefore, as shown in FIG. 1B, the light fluxes reflected by the deflective reflection surface 5a are also inclined with respect to the main scanning plane. The light beams having an angle with respect to the main scanning plane orthogonal to the rotation axis of the light deflector 5 may be irradiated at an angle by inclining the light source device 1, the coupling lens 2, and the first optical system 3 at desired angles or may be irradiated at an angle using the return mirror 4. The light beams traveling to the deflective reflection surface 5a may be irradiated at an angle by shifting the optical axis of the first optical system 3 in the sub-scanning direction.

The light fluxes reflected by the deflective reflection surface 5a are deflected at uniform angular velocity according to the uniform velocity rotation of the light deflector 5. The light fluxes are transmitted through a first scanning focus lens L1 and a second scanning focus lens L2 of an optical scanning optical system 6 and focused on a surface to be scanned 7. Consequently, the deflected light fluxes form light spots on the surface to be scanned 7 to be deflected in the main scanning direction to optically scan the surface to be scanned 7.

Characteristics of an oblique incidence optical system are explained below using an optical scanning device of a tandem color image forming apparatus as an example.

Figure 2:
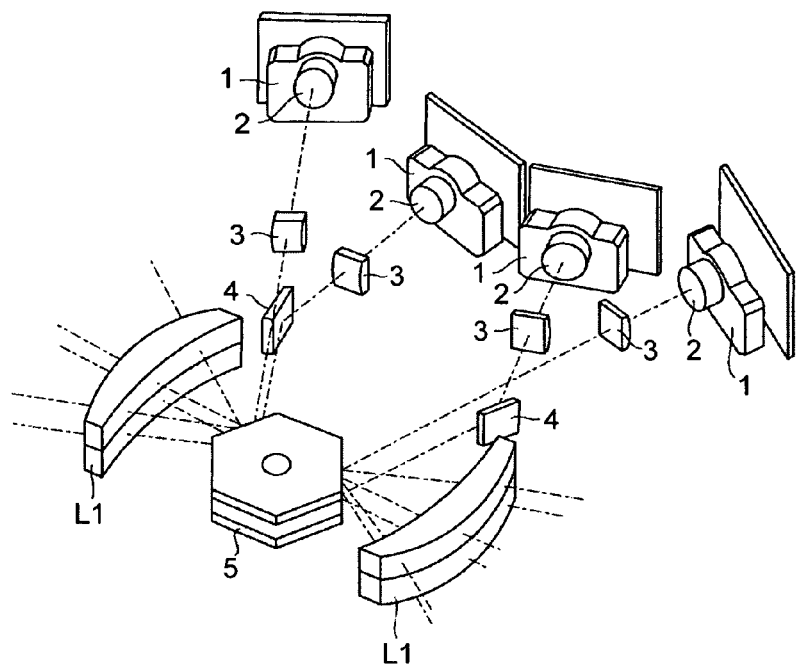
FIG. 2 is a schematic perspective view of an example of an optical scanning device of a counter-scanning system.
Figure 3:
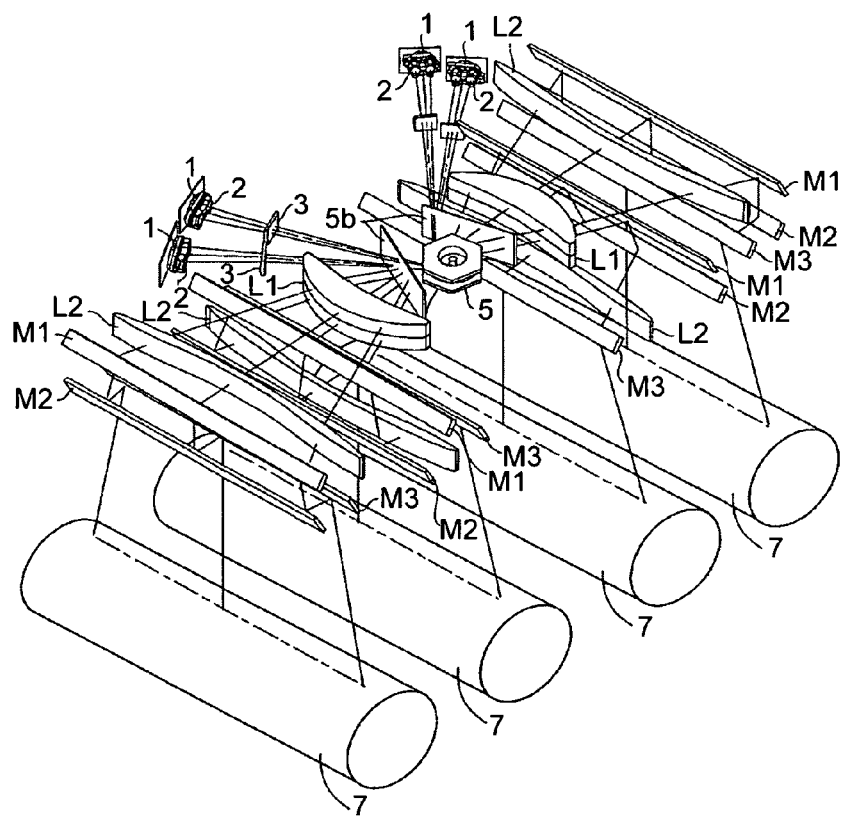
FIG. 3 is a schematic perspective view of an example of the optical scanning device of the counter-scanning system applied to a tandem color image forming apparatus.

FIG. 2 is a diagram of an example of a constitution of an optical scanning device of a counter-scanning system. FIG. 3 is a diagram of an example of the optical scanning device of the counter-scanning system applied to the tandem color image forming apparatus. In the figures, reference numeral 1 denotes light source devices; 2, coupling lenses; 3, cylindrical lenses; 4, return mirrors; and 5, a light deflector (a polygon mirror). Reference sign 5b denotes sound-proof glass; L1, first scanning focus lenses; L2, second scanning focus lenses; and M1 to M3, return mirrors. Reference numeral 7 denotes photosensitive drums serving as surfaces to be scanned.

Figure 4A:
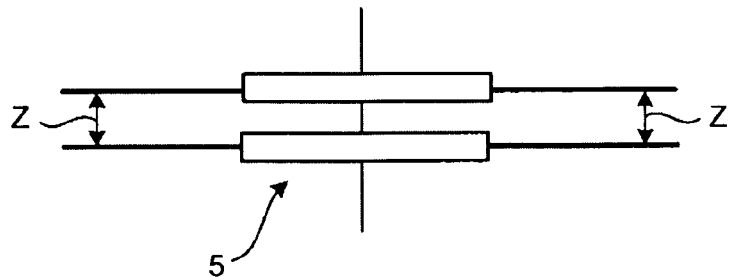
FIG. 4A is a diagram for explaining two light fluxes parallel to a normal of a deflective reflection surface made incident on the deflective reflection surface from the left and the right of a light deflector, respectively, in the optical scanning device of the counter-scanning system.

In the optical scanning device of the counter-scanning system shown in FIGS. 2 and 3, light fluxes from the four light sources 1 are divided into two light fluxes each in two directions by one light deflector 5 to perform deflective scanning. Conventionally, light beams are made incident on the deflective reflection surface 5a of the light deflector 5 from a direction orthogonal to the deflective reflection surface 5a. Thus, as shown in FIG. 4A, a polygon mirror formed with two stages in the sub-scanning direction is used as the light deflector 5 to obtain an interval Z necessary for separating light fluxes traveling to the surface to be scanned corresponding to the light fluxes, respectively. A polygon mirror with one stage may be used without forming the light deflector 5 with two stages. However, in that case, thickness in the sub-scanning direction of the polygon mirror section is increased to make the light scanning device unsuitable for an increase in speed and a reduction in cost.

Figure 4B:
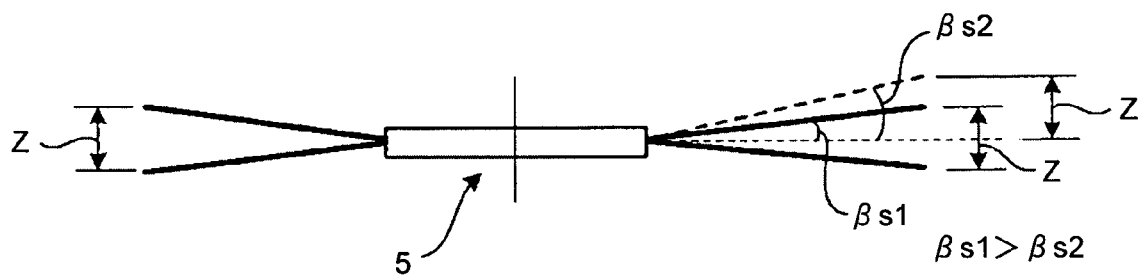
FIG. 4B is a diagram for explaining two light beams obliquely made incident on the deflective reflection surface from the left and the right of the light deflector at an angle with respect to the normal of the deflective reflection surface.

On the other hand, when the oblique incidence optical system, which is a form of the present invention, is used, it is unnecessary to give predetermined intervals to a plurality of light beams in the sub-scanning direction on the deflective reflection surface 5a of the light deflector 5. In other words, as shown in FIG. 4B, a pair of light beams from a plurality of light source devices having different angles in the sub-scanning direction with respect to the normal of the deflective reflection surface 5a of the light deflector 5 are made obliquely incident on the left and the right reflection surfaces of the identical light deflector 5 from the left and the right in the figure. Consequently, it is possible to constitute a polyhedron forming the deflective reflection surface 5a of the light deflector 5 with one stage and reduce thickness in the sub-scanning direction thereof. It is possible to reduce inertia of the light deflector 5 serving as a rotating member and reduce a start time. As opposed to the light deflector (the polygon mirror formed with two stages) 5 in the counter-scanning system shown in FIGS. 2 and 3, in the present invention, it is possible to constitute the light deflector 5 using a polygon mirror with one stage and reduce thickness in the sub-scanning direction. Thus, it is possible to reduce cost.

In an optical system of the counter-scanning system or the like, one side of which corresponds to two different surfaces to be scanned 7, all light beams, that is, all light beams traveling to the two different surfaces to be scanned 7 are changed to light beams having an angle with respect to a normal of a reflection surface of the light deflector (the polygon mirror) 5, or having an angle in the sub-scanning direction. This makes it possible to reduce cost of the light deflector having a high cost ratio among components constituting the optical scanning device and provide an optical scanning device that is capable of reducing power consumption and noise taking into account the environment.

In the conventional system for making light beams obliquely incident in the sub-scanning direction as opposed to the horizontal incidence, it is publicly known that, when light beams are made incident on a scanning focus lens at an angle in the sub-scanning direction, an amount of aberrations increases and optical performance is deteriorated. In the present invention, the deterioration in optical performance is corrected using a surface on which curvature in the sub-scanning direction changes according to an image height (hereinafter, "special toroidal surface). It is possible to hold down the deterioration in optical performance by reducing an angle with respect to the normal of the deflective reflection surface of the polygon mirror 5 (an angle of oblique incidence in the sub-scanning direction). This makes it possible to realize satisfactory optical performance. As a result, it is possible to obtain a stable beam spot diameter. This is advantageous for improvement of an image quality by a reduction in a beam spot diameter.

Figure 9:
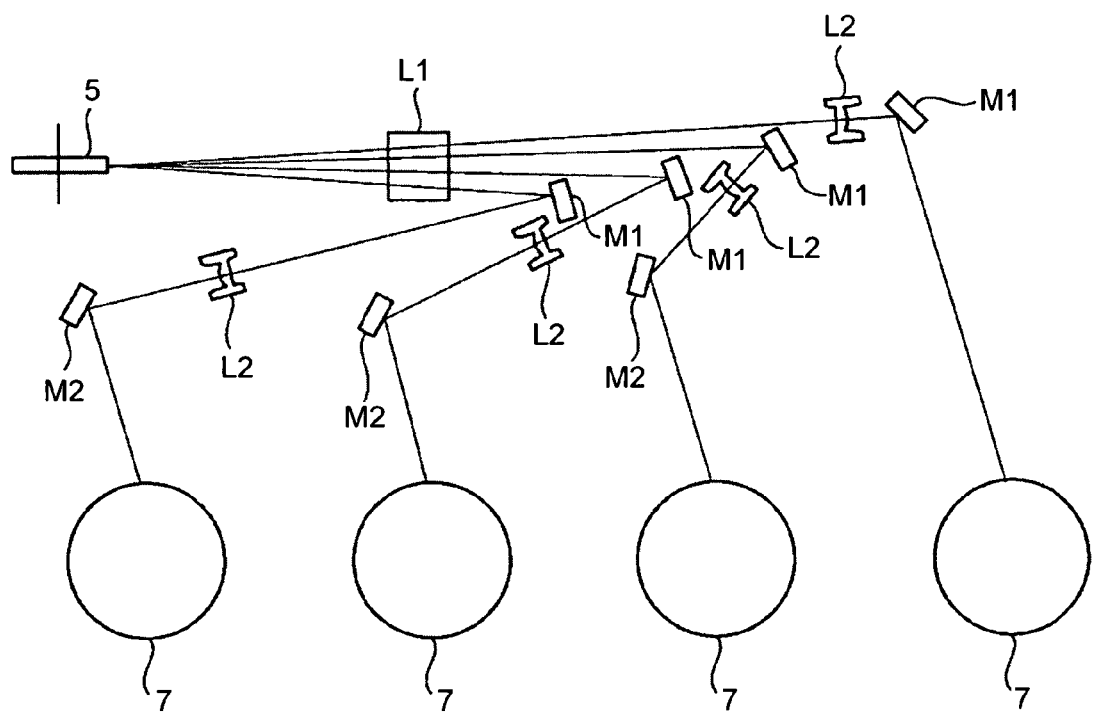
FIG. 9 is a schematic diagram of an optical scanning device of an oblique incidence one side scanning system according to the present invention.

Another form of the optical scanning device of the tandem color image forming apparatus is explained using a one side scanning system having a constitution shown in FIG. 9 as an example. In the optical scanning device of the one side scanning system, light beams from not-shown four light sources are divided in substantially the same directions by one light deflector (polygon mirror) 5. The light beams simultaneously subjects the four surfaces to be scanned 7 to deflective scanning via the common first scanning focus lens L1 and the second scanning focus lenses L2 corresponding to the respective light beams.

Figure 5A:
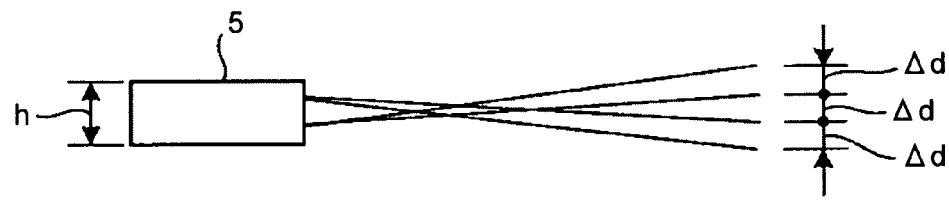
FIG. 5A is a diagram of a relation between a light deflector and emitted beams in a horizontal counter-scanning system.
Figure 5B:
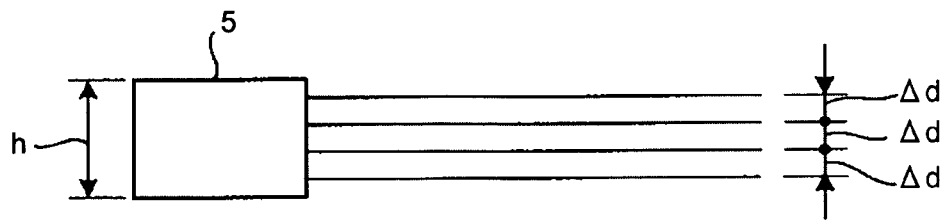
FIG. 5B is a diagram of a relation between a light deflector and emitted beams in an oblique incidence counter-scanning system.

In the case of the one side scanning system, in the conventional scanning device shown in FIG. 5B in which all light beams are parallel to the normal of the deflective reflection surface of the polygon mirror 5, satisfactory optical performance is obtained. On the other hand, light beams from the respective light source devices, that is, light beams led to surfaces to be scanned different from one another are required to have an interval (Δd in the figure) necessary for separating the light beams, usually an interval of 3 millimeters to 5 millimeters for each of the light beams. Therefore, height (height in the sub-scanning direction) h of the deflecting unit (the polygon mirror) 5 increases and an area of contact with the air increases. This causes problems like an increase in power consumption due to an influence of a windage loss, an increase in noise, and an increase in cost. In particular, since a cost ratio of the deflecting unit among the components of the optical scanning device is high, the problem in terms of cost is significant.

In this regard, in the optical scanning device according to the embodiment of the present invention, light beams from the light source devices reflected on the deflective reflection surface of the polygon mirror 5 serving as the deflecting unit are made incident on the first scanning focus lens as light beams having an angle (having an angle in the sub-scanning direction) with respect to the normal of the deflective reflection surface of the polygon mirror 5. Thus, as shown in FIG. 5A, it is possible to significantly reduce the height h of the polygon mirror 5. As in the explanation about the counter-scanning system, it is possible to constitute a polyhedron forming the deflective reflection surface of the light deflector 5 with one stage and reduce thickness in the sub-scanning direction thereof, reduce inertia of the light deflector 5 serving as a rotating member, and reduce a start time. As opposed to the polygon mirror formed with two stages in the conventional counter-scanning system, it is possible to reduce cost because only one stage of the polygon mirror is required.

To set an angle of oblique incidence smaller in the one side scanning system, a combination of horizontal incidence and oblique incidence is conceivable. Concerning the reduction in size of the polygon mirror 5, it is possible to solve the problems in the form in FIG. 5A in which the reduction in size is improved most compared with the conventional horizontal incidence.

As in the above explanation, in the system for making light beams obliquely incident in the sub-scanning direction as opposed to the conventional horizontal incidence, it is publicly known that, when light beams are made incident on a scanning focus lens at an angle in the sub-scanning direction, an amount of aberrations increases and optical performance is deteriorated. Thus, in the present invention, the deterioration in optical performance is corrected using a special toroidal surface described later. It is possible to hold down the deterioration in optical performance by reducing an angle with respect to the normal of the deflective reflection surface of the polygon mirror 5 (an angle of oblique incidence in the sub-scanning direction). This makes it possible to realize satisfactory optical performance. As a result, it is possible to obtain a stable beam spot diameter. This is advantageous for improvement of an image quality by a reduction in a beam spot diameter.

This system for making light beams obliquely incident in the sub-scanning direction as opposed to the conventional horizontal incidence has a problem in that a "scanning line curve" is large. An amount of occurrence of the scanning line curve is different depending upon an angle of oblique incidence in the sub-scanning direction of the respective light beams. When latent images drawn by the respective light beams are developed and visualized to be superimposed one on top of another using toners of the respective colors on a recording medium, the amount of occurrence of the scanning line curve appears as color drift. Since the light beams are made obliquely incident on the deflective reflection surface, light fluxes are made incident on a scanning focus lens in a twisted state. Thus, a wavefront aberration increases. In particular, optical performance is markedly deteriorated at a peripheral image height and a beam spot diameter increases. This prevents improvement of an image quality.

Occurrence of a wavefront aberration and occurrence of a scanning line curve in the oblique incidence optical system are explained. First, the occurrence of a scanning line curve is explained. For example, a distance from the deflective reflection surface of the light deflector to the incidence surface of the scanning focus lens is different depending upon a lens height in the main scanning direction. The distance is the same only when a shape in the main scanning direction of an incidence surface of a scanning focus lens constituting a scanning optical system, in particular, a scanning focus lens (the second scanning focus lens L2 in FIG. 1) having strong refracting power in the sub-scanning direction is an arc shape with a reflection point of light beams on the deflective reflection surface as the center. Usually, in maintaining optical performance, it is difficult to form the scanning focus lens in the shape. In other words, as shown in FIG. 1, usual light beams are used for deflective scanning by the light deflector 5. In the main scanning section, at each image height, the light beams are not made vertically incidence on a lens surface but are made incident at a certain angle of incidence in the main scanning direction.

Since the light beams have the angle in the sub-scanning direction in this way (the light beams are made obliquely incident), the light beams deflected and reflected by the light deflector have different distances from the deflective reflection surface of the light deflector to the incidence surface of the scanning focus lens depending upon an image height. An incidence height in the sub-scanning direction on the scanning focus lens of the light beams is higher or lower (depending upon a direction of the angle in the sub-scanning direction of the light beams) in the periphery of the scanning focus lens than in the center thereof. As a result, when the light beams pass through a surface having refracting power in the sub-scanning direction, a scanning line curve occurs because refracting power received in the sub-scanning direction is different. In the usual horizontal incidence, even if a distance from the deflective reflection surface to the incidence surface of the scanning focus lens is different, the light beams travel horizontally to the scanning focus lens. Thus, since an incidence position in the sub-scanning direction on the scanning focus lens is not different, a scanning line curve does not occur.

Deterioration in a wavefront aberration due to oblique incidence is explained. As explained above, unless a shape in the main scanning direction of the incidence surface of the scanning focus lens constituting the scanning optical system is an arc shape with the reflection point of the light beams on the deflective reflection surface as the center, a distance from the deflective reflection surface of the light deflector to the incidence surface of the scanning focus lens is different depending upon an image height. Usually, in maintaining optical performance, it is difficult to form the scanning focus lens in the shape. In other words, usual light beams are used for deflective scanning by the light deflector. In the main scanning section, at each image height, the light beams are not made vertically incidence on a lens surface but are made incident at a certain angle of incidence in the main scanning direction.

Figure 6:
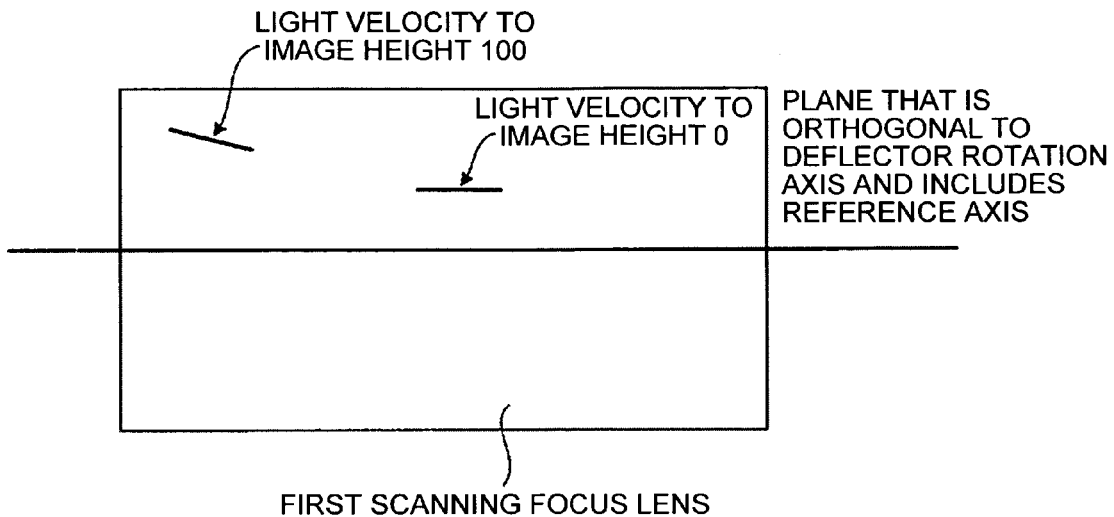
FIG. 6 is a conceptual diagram for explaining a wavefront aberration generating mechanism in an oblique incidence optical system.

A light flux of the light beams deflected and reflected by the light deflector has a certain width in the main scanning direction. The light beams at both ends in the main scanning direction in the light flux have different distances from the deflective reflection surface of the light deflector to the incidence surface of the scanning focus lens and have an angle in the sub-scanning direction because the light beams are made obliquely incident. Thus, the light flux is made incident on the scanning focus lens in a twisted state (FIG. 6). As a result, a wavefront aberration is markedly deteriorated and a beam spot diameter increases. An angle of incidence in the main scanning direction becomes acuter at an image height closer to a peripheral image height, twist of the light flux increases, and the increase in a beam spot diameter due to the deterioration in a wavefront aberration becomes larger in a position closer to the periphery.

In the present invention, the special toroidal surface is adopted to correct a wavefront aberration and a scanning line curve. It is also possible to correct a scanning line curve by tilting and decentering the lens surface in the sub-scanning direction. Scanning positions in the sub-scanning direction and an amount of deterioration in a wavefront aberration are balanced among image heights to correct scanning positions and wavefront aberrations at the respective image heights and correct the increase in a beam spot diameter due to a scanning line curve and deterioration in a wavefront aberration on a surface to be scanned.

However, an amount of deterioration in a wavefront aberration due to twist (skew) of a light flux made incident on the lens surface, an amount of change in the sub-scanning direction of object points among the image heights due to oblique incidence on the rotary polygon mirror, and a distance from the deflective reflection surface to the lens surface are different among the image heights. Thus, it is impossible to completely correct a wavefront aberration and a scanning line curve.

In the present invention, at least one lens surface of the scanning focus lens is the special toroidal surface, curvature in the sub-scanning direction of which changes according to an image height, and is a surface, curvature in the sub-scanning direction of which on a reference axis of the lens is zero or close to zero. In this way, correction of a wavefront aberration is carried out (the first aspect of the present invention).

The curvature in the sub-scanning direction on the reference axis is set to zero because deterioration in a wavefront aberration due to twist (skew) of a light flux made incident on the lens surface is small near the reference axis of the lens. The reference axis of the lens indicates a line connecting origins of equations representing a lens shape (described later). By adopting such a planar constitution, an optical system with less fluctuation in performance is obtained even if the optical system is decentered at the time of assembly or the like.

In the above explanation, the "surface, curvature in the sub-scanning direction of which changes according to an image height" is, for example, a WT surface. The "surface, curvature in the sub-scanning direction of which on the reference axis of the lens is zero or close to zero", is a special WT surface, a shape in the sub-scanning direction of which is a planar shape in the center of the lens. This lens surface does not have an inclination with respect to the reference axis and has curvature in the sub-scanning direction in the periphery of the lens.

On the other hand, there is a difference in that a tilt decentered surface does not have curvature at all lens heights and only has an inclination with respect to the reference axis.

Figure 17:
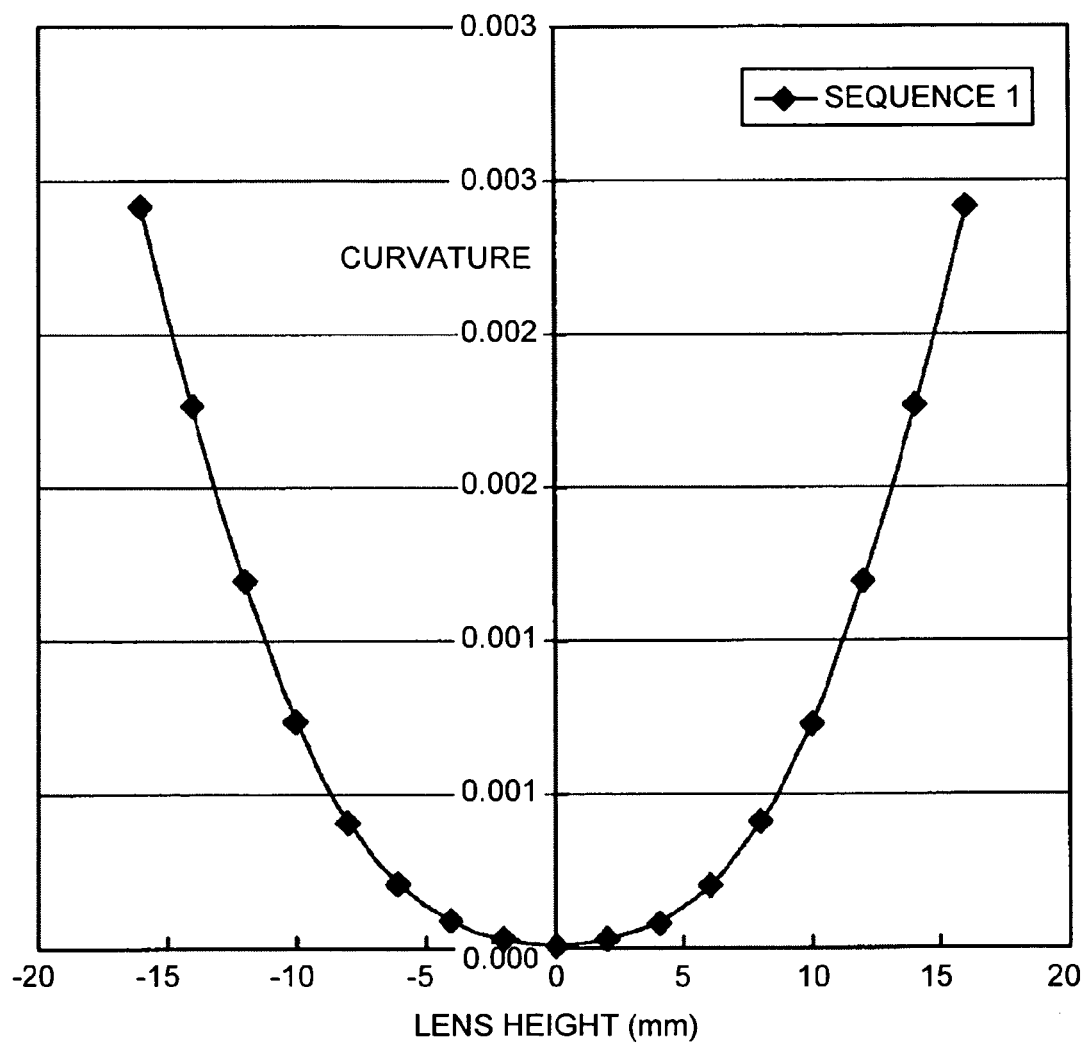
FIG. 17 is a graph of a relation between lens height and curvature in a sub-scanning direction on a special toroidal surface (a WT surface) of the present invention.

A graph shown in FIG. 17 is a graph in which a lens height is represented by an abscissa and curvature in the sub-scanning direction is represented by an ordinate with respect to the special toroidal surface (the WT surface) of the present invention. Curvature is 0 in the center and larger in a position closer to the periphery. The lens height is a distance from the reference axis in the main scanning direction.

In the present invention, it is preferable to dispose the lens surface of the scanning focus lens in the scanning focus lens (e.g., the first scanning focus lens L1) further on the light deflector side than the scanning focus lens (e.g., the second scanning focus lens L2) having largest refracting power in the sub-scanning direction (the second aspect of the present invention).

Large deterioration in a wavefront aberration occurs when a light flux is twisted, in particular, at the time of incidence on a scanning focus lens having strong refracting power in the sub-scanning direction. Thus, to correct the wavefront aberration, it is necessary to correct height of incidence on the scanning focus lens having strong refracting power in the sub-scanning direction to focus the light flux at one point on a surface to be scanned.

In the optical scanning optical system shown in FIG. 1, in correcting a wavefront aberration on the special toroidal surface, height of incidence on the second scanning focus lens L2 is increased. For light beams at both the ends in the main scanning direction in the light flux, height of incidence in the sub-scanning direction on the second scanning focus lens L2 having strong refracting power in the sub-scanning direction in a position closer to the periphery is increased. This makes it possible to correct the wavefront aberration. In other words, the special toroidal surface (the WT surface) is formed on the first scanning focus lens L1 further on the light deflector 5 side than the second scanning focus lens L2 having strongest refracting power in the sub-scanning direction. Thus, larger negative power is provided toward the periphery against light beams having an angle in the sub-scanning direction with respect to the normal of the deflective reflection surface of the light deflector 5. A position of incidence in the sub-scanning direction on the second scanning focus lens L2 having strong refracting power in the sub-scanning direction is adjusted. This makes it possible to correct deterioration in a wavefront aberration. Therefore, it is desirable to provide a special surface used for correcting a wavefront aberration on the first scanning focus lens L1 on the light deflector side rather than the second scanning focus lens L2 having strongest refracting power in the sub-scanning direction.

Correcting functions of the first scanning focus lens L1 close to the light deflector 5 (the scanning focus lens further on the light deflector side than the scanning focus lens having strong refracting power at least in the sub-scanning direction) and the second scanning focus lens L2 close to the surface to be scanned 7 (the scanning focus lens having strong refracting power in the sub-scanning direction) are separated. In this way, a wavefront aberration on the special toroidal surface of the first scanning focus lens L1 is corrected and a scanning line curve on the special surface of the second scanning focus lens L2 is corrected. This makes it possible to attain a further reduction in size of a beam spot diameter and a reduction of a scanning line curve. It goes without saying that the correcting functions do not have to be completely separated and a part of wavefront aberration correction and a part of scanning line curve correction may be carried out on the respective special surfaces.

More desirably, a shape in the sub-scanning direction is set as a planar shape without curvature and as a special surface having a different eccentric angle (a tilt amount) in a lens latitudinal direction (the sub-scanning direction) depending upon a lens height in a lens longitudinal direction (the main scanning direction). In this way, correction of a wavefront aberration and correction of a scanning line curve are carried out (the fifth aspect of the present invention). The tilt amount (the eccentric angle) of the special surface refers to an inclination angle in the latitudinal direction on an optical surface of an optical element. When the tilt amount is 0, the lens is in a state without inclination, that is, the same state as the usual lens.

The special surface of the scanning focus lens is explained.

When a paraxial curvature radius in a "main scanning section", which is a plane section including an optical axis and parallel to the main scanning direction, is RY, a distance in the main scanning direction from the optical axis is Y, higher-order coefficients are A4, A6, A8, A10, and the like, and a paraxial curvature radium in a "sub-scanning section" orthogonal to the main scanning section is RZ, a surface shape of the special surface of the scanning focus lens is represented by the following shape equation. However, the present invention is not limited to the following shape equation. It is also possible to specify the identical surface shape using another shape equation.

$$X(Y,Z) = Y^2 \cdot Cm/\{1+\sqrt{[1-(1+K)\cdot(Y\cdot Cm)^2]}\} + A4\cdot Y^4 + A6\cdot Y^6 + A8\cdot Y^8 + A10 Y^{10} + \ldots + (Cs(Y)\cdot Z^2)/\{1\sqrt{[1-(Cs(Y)\cdot Z)^2]}\} + (F0 + F1\cdot Y + F2\cdot Y^2 + F3\cdot Y^3 + F4\cdot Y^4 + \ldots)Z$$

where, $Cm = 1/RY$ and $Cs(Y) = 1/RZ$.

$(F0+F1\cdot Y+F2\cdot Y^2+F3\cdot Y^3+F4\cdot Y^4+\ldots)Z$ represents a tilt amount. When the special surface does not have a tilt amount, all of F0, F1, F2, and the like are 0. When F1, F2, and the like are not 0, a tilt amount changes in the main scanning direction.

A reason for setting a shape in the sub-scanning direction of the special surface of the scanning focus lens as a plane shape without curvature is explained.

When curvature is provided in the sub-scanning direction, a shape in the main scanning direction changes by a large degree for every height in the sub-scanning direction. Large fluctuation in a magnification error occurs when a position of incidence of light beams deviates in the sub-scanning direction because of temperature fluctuation and an assembly error of an optical element. In a color machine, a beam spot position deviates among respective colors to cause color drift. Thus, as in the present invention, a surface shape in the sub-scanning direction of the special surface of the scanning focus lens is set as a plane shape without curvature. Consequently, it is possible to reduce a shape error in the main scanning direction for each height in the sub-scanning direction, reduce fluctuation in a magnification error at the time when a position of incidence of light beams deviates in the sub-scanning direction, and control occurrence of color drift.

Actually, when the special surface is used, a main scanning shape changes according to height in the sub-scanning direction. However, since an amount of the change is small, it is possible to reduce the change in the main scanning shape compared with that at the time when curvature is provided in the sub-scanning direction. As a result, it is possible to reduce a difference of fluctuation in a magnification error among the light beams due to generation of a temperature distribution. It is possible to reduce color drift at an intermediate image height at the time when a writing start position and a writing end position are set be identical for the respective light beams by synchronizing the light beams.

Figure 7A:
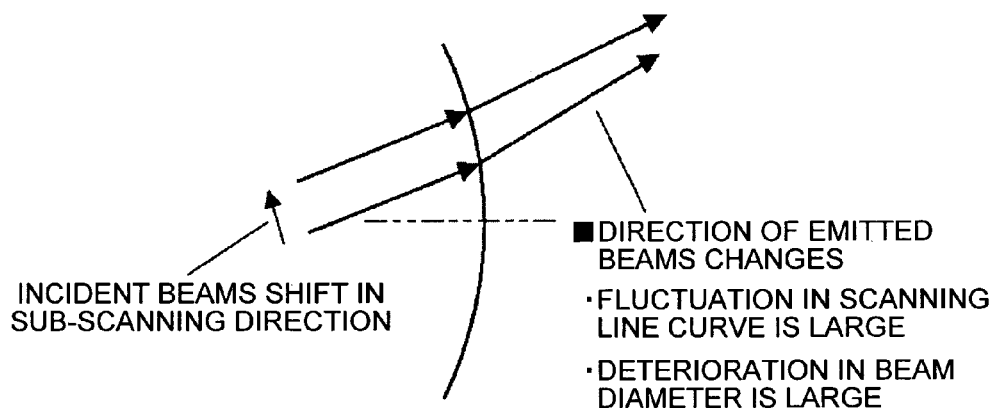
FIG. 7A is a diagram for explaining a scanning line curve and deterioration in a beam diameter in a scanning lens having refracting power in a sub-scanning direction at the time when incident beams on the scanning lens shift in the sub-scanning direction.
Figure 7B:
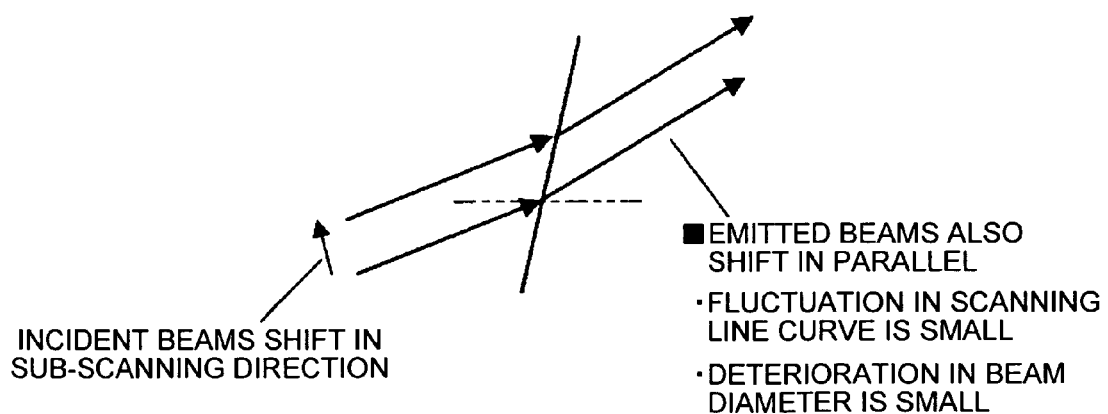
FIG. 7B is a diagram for explaining a scanning line curve and deterioration in a beam diameter in a scanning lens having refracting power in a sub-scanning direction at the time when incident beams on the scanning lens shift in the sub-scanning direction.

As shown in FIG. 7B, when an incident beam on the scanning focus lens shifts in the sub-scanning direction, since the special surface does not have refracting power, a traveling direction of the beam simply shifts. A change of the direction is small. However, on a surface having curvature in the sub-scanning direction, or having refracting power, as shown in FIG. 7A, when an incident beam shifts in the sub-scanning direction, a traveling direction of the beam changes because the refracting power changes. When an amount of the change of the traveling direction is different at the respective image heights, a large scanning line curve occurs. Further, since skew of a light flux occurs, deterioration in a wavefront aberration and deterioration in a beam spot diameter occur. Therefore, it is necessary to set a shape in the sub-scanning direction on the special surface of the scanning focus lens as a plane shape without curvature.

According to the present invention, through adoption of the special surface, it is possible to correct twist of a light flux by optimally giving a different tilt amount in the main scanning direction of the scanning focus lens. Concerning a scanning line curve, similarly, through adoption of the special surface, it is possible to correct the sub-scanning direction of light beams by optimally giving a different tilt amount in the main scanning direction of the scanning focus lens.

In this case, deterioration in a wavefront aberration due to incidence at an angle in the sub-scanning direction is extremely small because skew of a light flux hardly occurs with respect to the scanning focus lens near the optical axis. Therefore, it is possible to reduce an amount of eccentricity on the optical axis to zero on the special surface of the scanning focus lens in the present invention.

Conventionally, when the scanning focus lens or the lens surface is subjected to tilt decentering or shift decentering to correct a wavefront aberration and a scanning line curve, performance of the scanning focus lens or the lens surface is deteriorated to keep balance with a peripheral image height. However, in the present invention, it is unnecessary to decenter the scanning focus lens or the lens surface. It is possible to satisfactorily correct optical performance.

The special surface of the scanning focus lens explained above is optimally set for each of light beams traveling to different surfaces to be scanned, that is, for each angle (angle of oblique incidence) in the sub-scanning direction with respect to the normal of the deflective reflection surface of the light deflector 5. This makes it possible to perform satisfactory wavefront aberration correction and scanning line curve correction in all the light beams. In this case, even if angles of oblique incidence are different, it is possible to cope with the difference by changing the coefficient of the shape equation to optimally design the scanning focus lens using the special surface.

As shown in FIG. 1, light beams made incident on the deflective reflection surface 5a of the light deflector 5 are made incident at an angle in the main scanning direction to prevent the first scanning focus lens L1 from interfering with the light beams. This makes it possible to set an angle of incidence in the sub-scanning direction small. If an angle of oblique incidence in the sub-scanning direction is large, since the deterioration in optical performance increases, it is difficult to perform satisfactory correction. Therefore, it is desirable to make light beams incident on the deflective reflection surface 5a of the deflector 5 at an angle in the main scanning direction.

To further reduce cost of the optical scanning device of the present invention, it is desirable that at least the scanning focus lens closest to the light deflector (the first scanning focus lens L1) is shared by light beams from a plurality of light source devices 1 (the third aspect of the present invention). It is possible to reduce the number of components by integrally forming the shared lens and hold down fluctuation among the components.

For example, as shown in FIG. 9, in the one side scanning system, the single first scanning focus lens L1 is shared by all light beams traveling to the photosensitive members serving as the surfaces to be scanned 7 corresponding to the respective colors of cyan, magenta, yellow, and black. This makes it possible to significantly reduce the number of scanning focus lenses (the fourth aspect of the present invention). As shown in FIGS. 2 and 3, in the counter-scanning system, the first scanning focus lens L1 is shared by light beams for two colors. This makes it possible to reduce the number of scanning focus lenses.

To further increase speed of the optical scanning device of the present invention, it is preferable to use at least one surface having different curvature in the sub-scanning direction depending upon an image height of the scanning focus lens closest to the surface to be scanned (the ninth aspect of the present invention).

With such a constitution, it is possible to reduce a magnification error among image heights in an optical scanning optical system having a sub-scanning magnification of about −0.5 as in this embodiment. It is also possible to expect an effect that image surface curve in the sub-scanning direction is more satisfactorily corrected.

More preferably, curvature in the sub-scanning direction is changed asymmetrically in the main scanning direction with the reference axis of the lens as the center (the tenth aspect of the present invention). In the optical scanning device of the present invention, light beams are made incident on the light deflector (the polygon mirror) 5 at an angle in the main scanning direction. As a result, "optical sag" due to the light deflector 5 does not occur symmetrically in the main scanning direction with respect to the reference axis of the scanning focus lens. In other words, since an optical path length difference causing aberrations is not symmetrical with respect to the center, the aberrations also occur asymmetrically. Thus, with such a constitution, it is possible to perform efficient aberration correction.

Figure 8A:
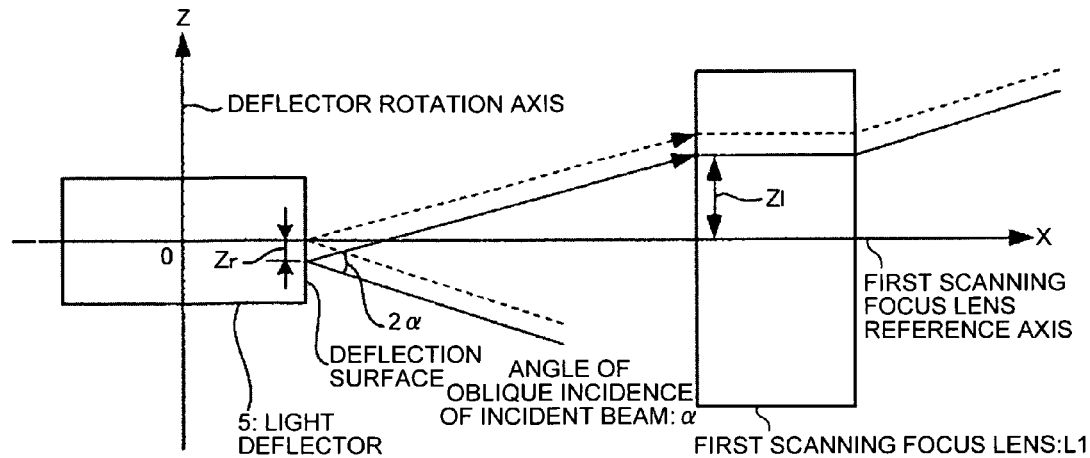
FIGS. 8A to 8C are conceptual diagrams for explaining an eleventh aspect of the present invention.

To further reduce a size and cost of the optical scanning device of the present invention, it is preferable to arrange a reflection point on the light deflector (the polygon mirror) 5 and an incidence point on the scanning focus lens L1 closest to the light deflector to be orthogonal to the rotation axis of the light deflector 5 and to be on opposite sides with respect to a plane including the reference surface of the scanning focus lens L1 (the eleventh and the sixteenth aspects of the present invention). A locus in the sub-scanning direction of the conventional oblique incidence optical system (a broken line) and a locus in the sub-scanning direction according to the present invention (a solid line) are shown in FIG. 8A. In the conventional oblique incidence optical system, the reflection point on the light deflector 5 and the reference plane coincide with each other. In the present invention, the reference plane is shifted to the opposite side of the incidence point of the first scanning focus lens L1 by Zr with respect to the sub-scanning direction. This makes it possible to reduce height in the sub-scanning direction of the first scanning focus lens L1 and reduce height of the entire optical scanning device. Height in the sub-scanning direction of the light deflector 5 also increases slightly. However, this could not be a problem because an amount of reduction in height of the first scanning focus lens L1 is larger.

Figure 8B:
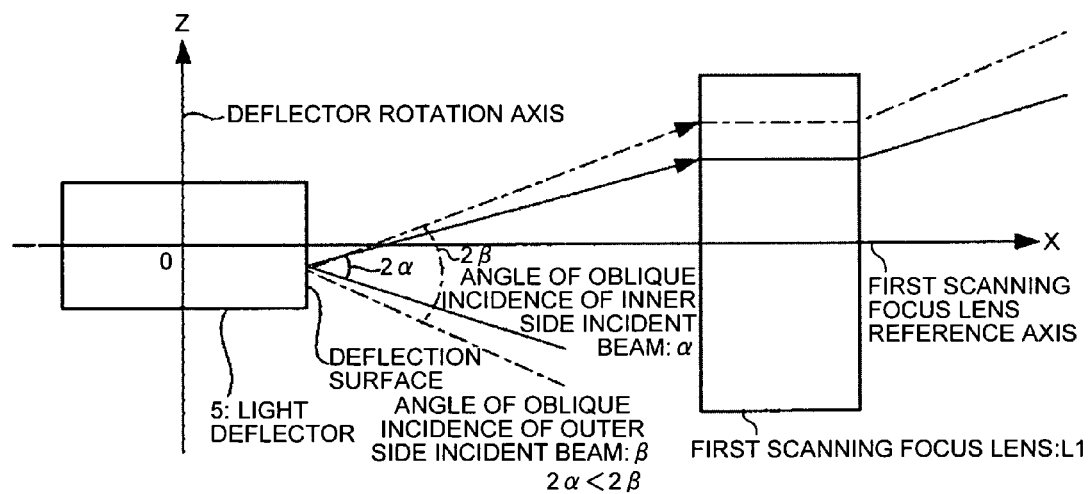
Figure 8C:
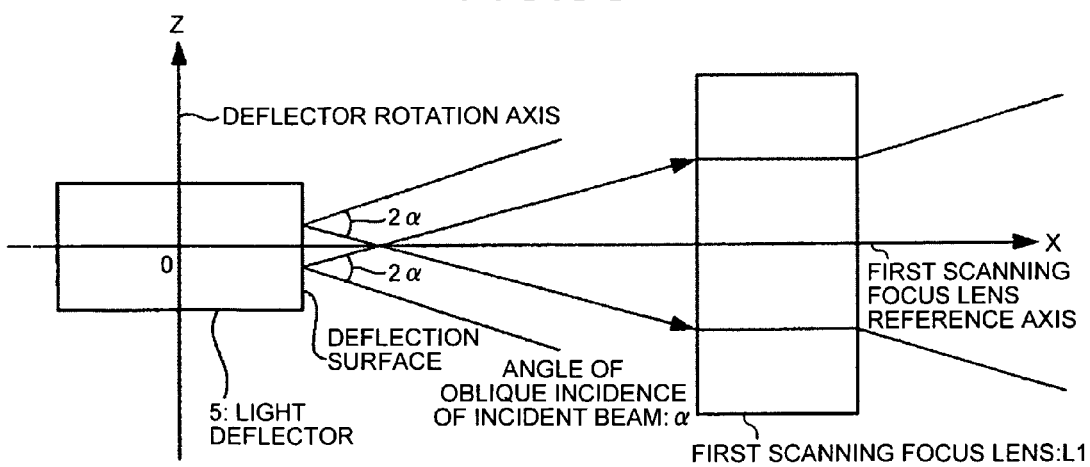

To further promote the reduction in size, as shown in FIG. 8B, it is preferable to make a plurality of light fluxes incident on an identical reflection point at oblique angles of incidence different from each other. Moreover, as shown in FIG. 8C, it is desirable that a plurality of light sources are arranged to be mirror symmetrical to one another with respect to the reference plane to share the first scanning focus lens L1. Mirror symmetry in this context means symmetry with respect to a surface that is, in a state in which all return mirrors after deflective reflection on the light deflector (the polygon mirror) 5 are omitted, parallel to the reflection surface of the polygon mirror and includes sub-scanning direction centers of a plurality of light beams reflected and deflected by the polygon mirror.

More desirably, when a distance from a plane that includes the reference axis of the scanning focus lens closest to the light deflector 5 (the first scanning focus lens L1) and is orthogonal to the rotation axis of the light deflector 5 to the incident point on the scanning focus lens closest to the light deflector 5 (the first scanning focus lens L1) is Zl and a distance from the plane to the reflection point on the light deflector 5 is Zr (see FIG. 8A), the following conditional expression is satisfied (the twelfth and the seventeenth aspects of the present invention).

$$-2.50 < Zl/Zr < -7.0$$

Zl/Zr is a measure for a reduction in size in the oblique incidence optical system. When Zl/Zr is smaller than −25.0, the first scanning focus lens L1 is too large in the sub-scanning direction to prevent the reduction in size. When Zl/Zr is larger than −7.0, in such an optical system, the light deflector 5 is too large in the sub-scanning direction or, since a light beam is too close to other light beams, an optical path length is required for light flux separation for the light beams. In both the cases, it is impossible to reduce the size.

Therefore, more desirably, the following conditional expression is satisfied.

$$-22.0 < Zl/Zr / -8.0$$

In the optical scanning device according to the present invention, to further promote the reduction in cost, it is preferable to use a plastic lens as the scanning focus lens. A degree of freedom of a surface shape is improved by forming the scanning focus lens from plastic. It is possible to also expect an effect that more satisfactory optical performance can be attained.

Figure 18A:
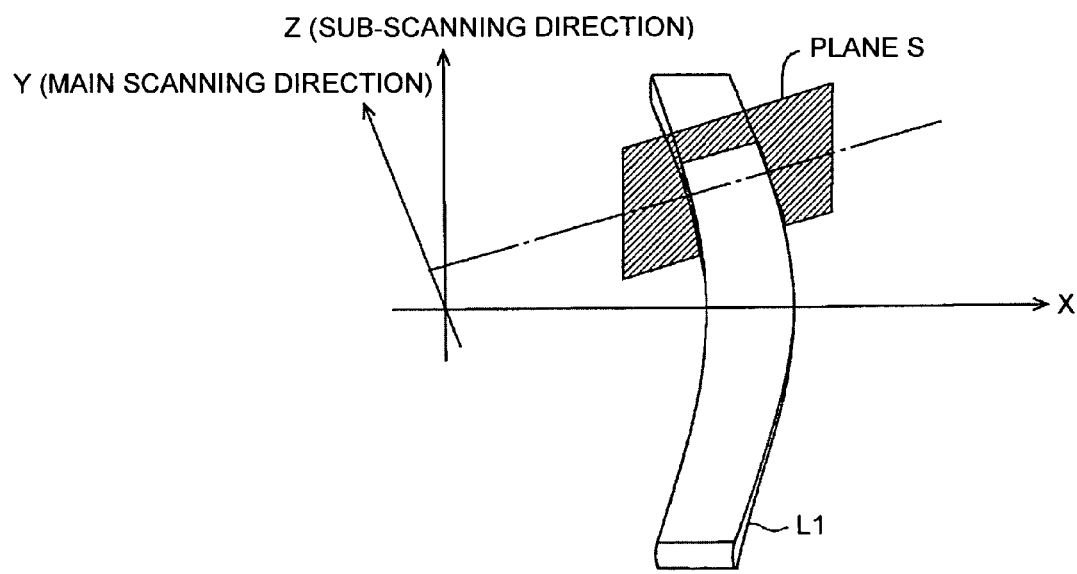
FIGS. 18A and 18B are diagrams for explaining planes that include beams and are parallel to a sub-scanning direction.
Figure 18B:
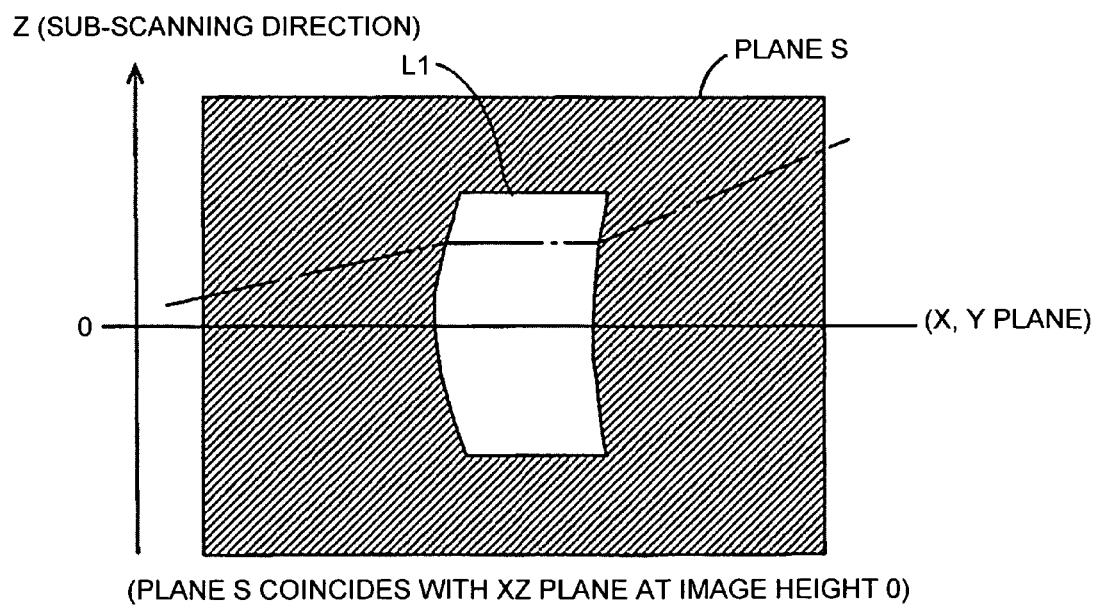

In the optical scanning device of the present invention, to perform more satisfactory wavefront aberration correction, it is preferable to change curvature in the sub-scanning direction according to an image height such that negative power of sub-scanning increases as the image height increases. More specifically, the scanning focus lens L1 closest to the light deflector 5 of the optical scanning optical system 6 is formed in a surface shape in which curvature in the sub-scanning direction changes according to an image height such that negative power in the sub-scanning direction in a plane that includes beams and is parallel to the sub-scanning direction increases as the image height increases (the thirteenth aspect of the present invention). The "plane that includes beams and is parallel to the sub-scanning direction" indicates a plane S shown in FIG. 18A. At an image height 0, as shown in FIG. 18B, the plane S coincides with an XZ plane.

In the optical scanning device of the present invention, light beams are made incident at an angle in the sub-scanning direction with respect to the normal of the deflective reflection surface of the light deflector 5. The lens surface of the scanning focus lens L1 closest to the light deflector 5 of the optical scanning optical system 6 is a surface, curvature in the sub-scanning direction of which changes according to an image height such that emitted light is further apart from the reference axis with respect to the sub-scanning direction as the image height increases (the fourteenth aspect of the present invention).

As explained above, an angle of incidence in the main scanning direction on the scanning focus lens becomes acuter at an image height closer to a peripheral image height, twist of the light flux increases, and the increase in a beam spot diameter due to the deterioration in a wavefront aberration becomes larger in apposition closer to the periphery.

Large deterioration in a wavefront aberration occurs when a light flux is twisted, in particular, at the time of incidence on a scanning focus lens having strong refracting power in the sub-scanning direction (e.g., the second scanning focus lens L2). Thus, to correct the wavefront aberration, it is necessary to correct height of incidence on the scanning focus lens having strong refracting power in the sub-scanning direction to focus the light flux at one point on a surface to be scanned. In correcting a wavefront aberration on the special toroidal surface, height of incidence on the second scanning focus lens L2 is increased. For light beams at both the ends in the main scanning direction in the light flux, height of incidence in the sub-scanning direction on the second scanning focus lens L2 having strong refracting power in the sub-scanning direction in a position closer to the periphery is increased. This makes it possible to correct the wavefront aberration. In other words, the special toroidal surface is formed on the first scanning focus lens L1 further on the light deflector 5 side than the second scanning focus lens L2 having strongest refracting power in the sub-scanning direction. Thus, larger negative power is provided toward the periphery against light beams having an angle in the sub-scanning direction with respect to the normal of the deflective reflection surface of the light deflector 5. A position of incidence in the sub-scanning direction on the second scanning focus lens L2 having strong refracting power in the sub-scanning direction is adjusted. This makes it possible to correct deterioration in a wavefront aberration. Therefore, it is desirable to provide a special surface used for correcting a wavefront aberration on the first scanning focus lens L1 on the light deflector side rather than the second scanning focus lens L2 having strongest refracting power in the sub-scanning direction.

More desirably, at least one lens surface of the first scanning focus lens L1 closest to the light deflector 5 is a surface, curvature of which on the reference axis of the lens is zero or substantially zero, and is a surface, curvature in the sub-scanning direction of which changes according an image height such that negative power of sub-scanning in a plane that includes beams and is parallel to the sub-scanning direction increases as the image height increases (see FIGS. 18A and 18B) (a reason for this is omitted because the reason has already been described) (the fifteenth aspect of the present invention).

FIG. 9 is a diagram in which the scanning focus lens in the explanation is applied to the optical scanning device of the one side scanning system. Concerning an incident beam not shown in the figure, as described in the eleventh aspect of the present invention, it is preferable that the reflection point on the light deflector 5 and the incidence point on the first scanning focus lens L1 closest to the light deflector 5 are present on the opposite sides from each other with respect to the plane that includes the reference axis of the lens and is orthogonal to the rotation axis of the light deflector 5.

In the optical scanning device according to the present invention, it is preferable that the light source device 1 is, for example, a semiconductor laser array that has a plurality of light-emitting points or a multi-beam light source device that uses a plurality of light sources having a single light-emitting point or a plurality of light-emitting points and the light source device 1 simultaneously scans surfaces of photosensitive drums with a plurality of light beams (the eighteenth aspect of the present invention). Consequently, it is possible to constitute an optical scanning device and an image forming apparatus in which an increase in speed and an increase in density are realized. When the optical scanning device and the image forming apparatus are constituted in this way, it is possible to obtain the same effects by using the optical scanning optical system 6 (the scanning focus lenses L1 and L2) explained in the first embodiment.

Figure 10A:
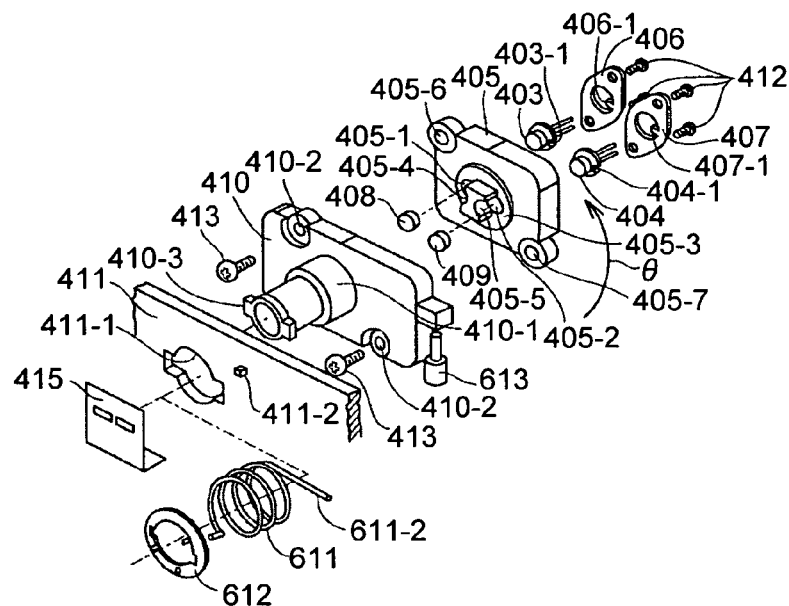
FIGS. 10A to 10C are diagrams of examples of light source units constituting a multi-beam light source device.
Figure 10B:
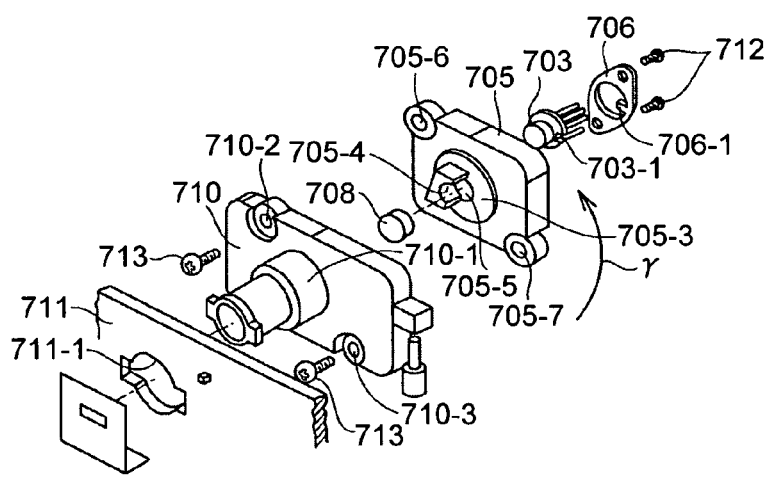

Examples of a light source unit constituting a multi-beam light source device are shown in FIGS. 10A and 10B.

FIG. 10A is a disassembled perspective view of a light source unit according to the first embodiment of the present invention. In FIG. 10A, two semiconductor lasers 403 and 404 serving as light sources are separately fit in fitting holes 405-1 and 405-2, which are formed in a base member 405, respectively, from the rear side of the base member. The fitting holes 405-1 and 405-2 are slightly inclined in the mainscanning direction at a predetermined angle, in this embodiment, about 1.5 degrees. The semiconductor lasers 403 and 404 fit in the fitting holes are also inclined in the main scanning direction at about 1.5 degrees. The semiconductor lasers 403 and 404 have notches formed in cylindrical heat sink sections 403-1 and 404-1 thereof. Arrangement directions of the light-emitting sources are aligned by putting protrusions 406-1 and 407-1 formed in center circles of pressing members 406 and 407 on the notches of the heat sink sections 403-1 and 404-1. The pressing members 406 and 407 are fixed to the base member 405 from the rear side thereof by screws 412, whereby the semiconductor lasers 403 and 404 are fixed to the base member 405. Collimate lenses 408 and 409 are adjusted in an optical axis direction with outer peripheries thereof set along semicircular attachment guide surfaces 405-4 and 405-5 of the base member 405. The collimate lenses 408 and 409 are positioned and bonded to each other such that divergent beams emitted from light-emitting points change to parallel light fluxes.

In the example shown in FIG. 10A, beams from the respective semiconductor lasers are set to cross in a main scanning surface. Thus, the fitting holes 405-1 and 405-2 and the semi-circular attachment guide surfaces 405-4 and 405-5 are formed to be inclined along a ray direction.

A cylindrical engaging section 405-3 of the base member 405 is engaged with a holder member 410 and screws 413 are screwed in screw holes 405-6 and 405-7 of the base member 405 through through-holes 410-2 to fix the base member 405 to the holder member 410. In this way, the light source unit is constituted.

A cylindrical section 410-1 of the holder member 410-1 of the light source unit is fit in a reference hole 411-1 provided in an attachment wall 411 of an optical housing. A spring 611 is inserted from the front side of the attachment wall 411 to engage a stopper member 612 with a cylindrical section protrusion 410-3 to hold the holder member 410 in close contact with the rear side of the attachment wall 411. Consequently, the light source unit is held in the optical housing. One end of the spring 611 is hooked on a protrusion 411-2 of the attachment wall 411 and the other end of the spring 611 is hooked on the light source unit to generate a torque with the center of the cylindrical section as a rotation axis in the light source unit. An adjustment screw 613 is provided to lock the torque of the light source unit. It is possible to rotate the entire unit in a θ direction around the optical axis to adjust a beam pitch. An aperture 415 is arranged in front of the light source unit. Slits corresponding to the respective semiconductor lasers are provided in the aperture 415 to define an emission diameter of light beams when the aperture 415 is attached to the optical housing.

FIG. 10B is a disassembled perspective view of a light source unit according to a second embodiment of the present invention. In FIG. 10B, a light source is a multi-beam semi-conductor laser 703 that includes a plurality of (e.g., four)

light-emitting sources. Light beams from the multi-beam semiconductor laser 703 are combined by a beam combining unit. In FIG. 10B, reference numeral 706 denotes a pressing member; 705, a base member; 708, a collimate lens; 710, a holder member; and 711, an attachment wall of an optical housing. This embodiment is different from the embodiment shown in FIG. 10A in that there is only one multi-beam semiconductor laser 703 serving as a light source and, therefore, there is only one pressing member 706. Otherwise, this embodiment is basically the same as the embodiment shown in FIG. 10A.

Figure 10C:
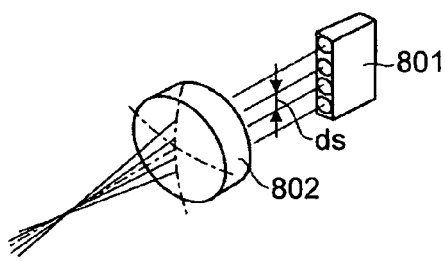

FIG. 10C is a diagram of a light source unit having a constitution similar to that in the example shown in FIG. 10B. In an example shown in FIG. 10C, a semiconductor laser array 801 having four light-emitting sources as a multi-beam source is used. Light beams from the semiconductor laser array 801 are combined using a beam combining unit 802. If the semiconductor laser array 801 is used as the light source 703 in FIG. 10B, basic components are the same as those in FIGS. 10A and 10B. Thus, explanations of the components are omitted.

Figure 11:
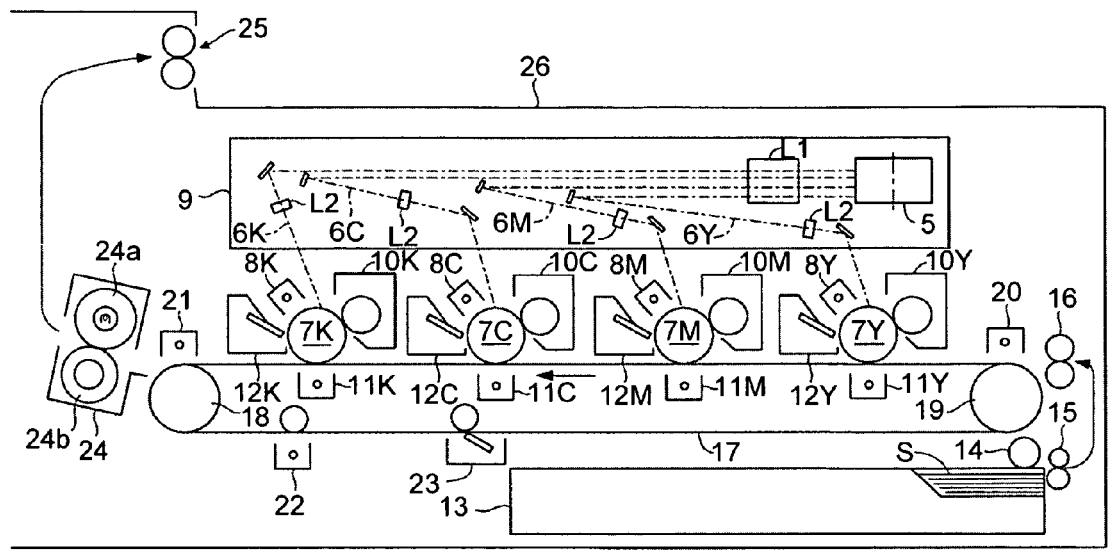
FIG. 11 is a schematic diagram of an image forming apparatus that uses the optical scanning device according to an embodiment of the present invention, that is, a tandem color laser printer.

An embodiment of an image forming apparatus using the optical scanning device according to the present invention is explained below with reference to FIG. 11 (the nineteenth aspect of the present invention). This embodiment is an example in which the optical scanning device according to the present invention is applied to a tandem full color laser printer. In FIG. 11, a conveyor belt 17 that conveys a recording material (e.g., a transfer sheet) S fed from a sheet feeding cassette 13 disposed in the horizontal direction is provided in a lower side in the apparatus. On the conveyor belt 17, a photosensitive member 7Y for yellow (Y), a photosensitive member 7M for magenta (M), a photosensitive member 7C for cyan (C), and a photosensitive member 7K for black (K) are disposed at equal intervals in order from an upstream side to a downstream side in a conveying direction of the transfer sheet S. In the following explanation, subscripts Y, M, C, and K are affixed to reference numerals to distinguish components. All the photosensitive members 7Y, 7M, 7C, and 7K are formed to have an identical diameter. Process members that execute respective processes according to an electrophotographic process are disposed in order around the photosensitive members. Explaining the photosensitive member 7Y as an example, a charger 8Y, an optical scanning optical system 6Y of an optical scanning device 9, a developing device 10Y, a transfer charger 11Y, a cleaning device 12Y, and the like are disposed in order. The same devices are provided for the other photosensitive members 7M, 7C, and 7K.

In this embodiment, the surfaces of the photosensitive members 7Y, 7M, 7C, and 7K are used as surfaces to be scanned (or surfaces to be irradiated) set for the respective colors. Optical scanning optical systems 6Y, 6M, 6C, and 6K are provided in a one-to-one relation in association with the respective photosensitive members 7Y, 7M, 7C, and 7K. However, as in FIG. 9, the light deflector 5 and the scanning focus lens L1 on the side close to the light deflector 5 are shared by the four optical scanning optical systems 6Y, 6M, 6C, and 6K. The scanning focus lenses L2 on the side close to the photosensitive members (the surfaces to be scanned) 7Y, 7M, 7C, and 7K are provided in the optical systems, respectively. A plurality of light source devices, a coupling lens, an aperture, a cylindrical lens, and the like are not shown in the figure.

The conveyor belt 17 is supported by a driving roller 18 and a driven roller 19 to be rotated in a direction of an arrow in the figure. Around the conveyor belt 17, registration rollers 16 and a belt charger 20 are provided further on the upstream side than the photosensitive member 7Y. A belt separating charger 21, a belt electricity removing charger 22, a belt cleaning device 23, and the like are provided further on the downstream side in the rotating direction of the belt 17 than the photosensitive member 7K. A fixing device 24 including a heating roller 24a and a pressure roller 24b is provided further on the downstream side in the transfer sheet conveying direction than the belt separating charger 21. The fixing device 24 is connected to a sheet discharge tray 26 by sheet discharge rollers 25.

In the laser printer with such a schematic constitution, for example, at the time of a full color mode (plural color mode), the respective photosensitive members 7Y, 7M, 7C, and 7K are charged by the chargers 8Y, 8M, 8C, and 8K. Then, based on image signals of the respective colors Y, M, C, and K, electrostatic latent images corresponding to the respective color signals are formed on the surfaces of the photosensitive members 7Y, 7M, 7C, and 7K by optical scanning of light beams by the respective optical scanning optical systems 6Y, 6M, 6C, and 6K of the optical scanning device 9. The electrostatic latent images are developed with toners of the respective colors Y, M, C, and K by the developing devices 10Y, 10M, 10C, and 10K corresponding to the respective latent images to be toner images. The transfer sheet S in the sheet feeding cassette 13 is fed by a sheet feeding roller 14 and conveying rollers 15 at the same timing as this image formation process. The transfer sheet S is sent to the conveyor belt 17 by the registration rollers 16. The transfer sheets fed to the conveyor belt 17 is electrostatically stuck to the conveyor belt 17 by an action of the belt charger 20 and conveyed to the photosensitive members 7Y, 7M, 7C, and 7K. The images on the respective photosensitive members 7Y, 7M, 7C, and 7K are sequentially transferred onto the transfer sheet S to be superimposed one on top of another. Consequently, a full color image is formed on the transfer sheet S. The transfer sheet S having the full color image transferred thereon is separated from the conveyor belt 17 by the belt separating charger 21 and conveyed to the fixing device 24. After the full color image is fixed on the transfer sheet S by the fixing device 34, the transfer sheet S is discharged to the sheet discharge tray 26 by the sheet discharge rollers 25.

In this embodiment, the optical scanning device 9 (the optical scanning optical systems 6Y, 6M, 6C, and 6K) of the image forming apparatus having the constitution described above is constituted in the same manner as the optical scanning optical system of the optical scanning device in FIG. 9. Consequently, it is possible to effectively correct a scanning line curve and deterioration in a wavefront aberration and realize an image forming apparatus that does not cause color drift and can secure reproducibility of a high-quality image.

In the above explanation, the optical scanning device 9 of the one side scanning system having the same constitution as that in FIG. 9 is explained as an example. Besides, the optical scanning device 9 may adopt the constitution of the optical scanning device of the counter-scanning system shown in FIGS. 2 and 3. In that case, the light deflector 5 is arranged in the center, the optical scanning optical systems for Y and M are arranged on one side of the light deflector 5, and the optical scanning optical systems for C and K are arranged on the other side. This makes it possible to simultaneously subject four light beams to deflective scanning with one light deflector 5 in the same manner. In this case, it is also possible to effective correct a scanning line curve and deterioration in a wavefront aberration and realize an image forming apparatus that does not cause color drift and can secure reproducibility of a high-quality image by applying the constitution of the optical scanning device explained in the first and the second embodiments to the optical scanning optical systems of the respective colors.

Specific numerical examples 1 and 2 concerning the optical scanning device of the present invention are described below.

In the numerical examples, the optical scanning device of the one side scanning system having the constitution shown in FIG. 9, to which the oblique incidence optical system in FIG. 1 is applied, is explained as an example. In the oblique incidence optical system, two light fluxes each are made obliquely incident on the deflective reflection surfaces of the polygon mirror of the one stage constitution serving as the light deflector 5 at angles symmetrical in the sub-scanning direction across the main scanning direction (a form obtained by combining FIGS. 8A and 8C).

The semiconductor laser 1 used as a light source has a light emission wavelength of 780 nanometers. A divergent light flux radiated from the semiconductor laser 1 is converted into "substantially parallel light fluxes" by the coupling lens 2. After a light flux diameter is narrowed by the aperture, the light flux is focused as a "line image long in the main scanning direction" in a position of the deflective reflection surface of the polygon mirror 5 according to an action of the cylindrical lens 3. The polygon mirror 5 is a polygon mirror that has six deflective reflection surfaces and an inscribed circle radius of 13 millimeters. The rotation axis of the polygon mirror 5 and the deflective reflection surface 5a are formed in parallel to each other. Light beams are made obliquely incident on the deflective reflection surface 5a of the polygon mirror 5 as shown in FIG. 8B. An inner side light flux is made incident on the deflective reflection surface 5a of the polygon mirror 5 at an angle of incidence of 1.46 degrees and an outer side light flux is made incident thereon at an angle of incidence of 3.30 degrees. In the main scanning direction, light beams are made incident at about 60 degrees with respect to a light flux traveling to an image height 0. A scanning width on a surface to be scanned is 220 millimeters.

In the optical system in this example, a sound-proof glass with thickness of 1.9 millimeters (an index of refraction of 1.5143) is inserted and arranged to be inclined in a deflection surface by 10 degrees.

The numerical examples described below is lens data concerning a scanning focus lens on which an inner side light flux is made obliquely incident on the deflective reflection surface of the light deflector (the polygon mirror) at 1.46 degrees and an outer side light flux is made obliquely incident at 3.30 degrees in the optical scanning device of the one side scanning system. Lens data concerning the scanning focus lens on which light beams are obliquely made incident at −1.46 degrees and −3.30 degrees on the opposite side across the main scanning section has a shape with the identical main scanning shape and a sign of a coefficient of the special surface inverted. In other words, the lens data has a shape mirror symmetrical in the sub-scanning direction with respect to this numerical example.

In tables (Table 1, Table 2, Table 5, and Table 6) in the numerical examples 1 and 2, the first scanning focus lens L1 indicated by surface numbers 1 and 2 is a shared lens. The second scanning focus lens L2 indicated by surface numbers 3 and 4 is provided in association with respective light fluxes. Surface number 5 indicates the surface to be scanned 7.

In the tables, surfaces indicated by surface numbers 1, 2, and 3 affixed with "*" (a surface on the incidence side and a surface on an emission side of the first scanning focus lens L1 and a surface on the incidence side of the second scanning focus lens L2) are special toroidal surfaces. The surfaces have a non-arc shape in the main scanning direction and a curvature radius in the sub-scanning direction of the surfaces continuously changes according to a lens height. The respective surface shapes are given by the shape equation described above. However, a main scanning shape X(Y) and sub-scanning curvature Cs(Y) are calculated by the following equation.

$$X(Y) = CY^2/\{1+\sqrt{1-(1+K) \cdot C^2 Y^2}\} + A4 \cdot Y^4 + A6 \cdot Y^6 + A8 \cdot Y^8 + A10 \cdot Y^{10} \ldots$$

$$Cs(Y) = 1/RZ + B1 \cdot Y + B2 \cdot Y^2 + B3 \cdot Y^3 + B4 \cdot Y^4 + B5 \cdot Y^5 + B6 \cdot Y^6 + B7 \cdot Y^7 + B8 \cdot Y^8 + B9 \cdot Y^9 + B10 \cdot Y^{10} \ldots$$

A surface indicated by surface number 4 affixed with (a surface on the emission side of the second scanning focus lens L2) is a tilt decentered surface. A lens surface shape is given by the following equation.

$$X(Y,Z) = Y^2 \cdot Cm/\{1+\sqrt{1-(1+K) \cdot (Y \cdot Cm)^2}\} + A4 \cdot Y^4 + A6 \cdot Y^6 + A8 \cdot Y^8 + A10 \cdot Y^{10} + \ldots + (Cs(Y) \cdot Z^2)/\{1+\sqrt{1-(Cs(Y) \cdot Z)^2}\} + (F0 + F1 \cdot Y + F2 \cdot Y^2 + F3 \cdot Y^3 + F4 \cdot Y^4 + \ldots)Z$$

where,

Cm=1/RY and Cs(Y)=1/RZ.

Specific data of the optical scanning optical system in the numerical example 1 is shown in Tables 1 to 4 below.

TABLE 1

Inner side light flux (angle of incidence: 1.46°)

| Surface number | RY (mm) | RZ (mm) | X (m) | N | Remarks |
|---|---|---|---|---|---|
| Deflection surface | ∞ | ∞ | — | — | Deflection surface |
| 1* | −756.000 | ∞ | 5.00 | 1.5240 | First scanning focus lens |
| 2* | −114.717 | ∞ | 161.00 | — | |
| 3* | −7650.000 | 34.575 | 3.00 | 1.5240 | Second scanning focus lens |
| 4 | 2057.754 | ∞ | 97.73 | — | |
| 5 | — | — | — | — | Surface to be scanned |

TABLE 2

Outer side light flux (angle of incidence: 3.30°)

| Surface number | RY (mm) | RZ (mm) | X (m) | N | Remarks |
|---|---|---|---|---|---|
| Deflection surface | ∞ | ∞ | — | — | Deflection surface |
| 1* | −756.000 | ∞ | 5.00 | 1.5240 | First scanning focus lens |
| 2* | −114.717 | ∞ | 161.00 | — | |
| 3* | −7650.000 | 34.707 | 3.00 | 1.5240 | Second scanning focus lens |
| 4 | 1884.834 | ∞ | 97.73 | — | |
| 5 | — | — | — | — | Surface to be scanned |

TABLE 3

Aspherical coefficient (first scanning focus lens)

|     | First surface | Second surface |
|-----|---------------|----------------|
| RY  | −765.000      | −114.717       |
| K   | 0.000         | 0.000          |
| A4  | −5.01156E−07  | −7.83227E−08   |
| A6  | 1.91364E−09   | 1.01891E−09    |
| A8  | −4.76701E−12  | −1.81952E−12   |
| A10 | —             | −2.04692E−15   |
| RZ  | ∞             | ∞              |
| B2  | 2.62701E−04   | 2.19837E−04    |
| B4  | −1.10168E−07  | 5.00535E−08    |
| B6  | 3.82783E−10   | 2.17043E−10    |
| B8  | 3.78340E−13   | 2.46405E−13    |
| B10 | 3.17419E−16   | 9.10197E−16    |

TABLE 4

Aspherical coefficient (second scanning focus lens)

|     | Third surface | Fourth surface |
|-----|---------------|----------------|
| *Inner side light flux (angle of incidence: 1.46°)* | | |
| RY  | −7650.000     | 2057.754       |
| K   | 0.000         | 0.000          |
| A4  | 7.45831E−08   | 3.04701E−08    |
| A6  | −4.26286E−11  | −3.81051E−11   |
| A8  | 5.66751E−15   | 4.90482E−15    |
| A10 | −2.25893E−19  | −1.84090E−19   |
| RZ  | 34.575        | ∞              |
| B1  | −3.98994E−07  | —              |
| B2  | −9.45192E−07  | —              |
| B3  | 3.68489E−10   | —              |
| B4  | 3.11863E−10   | —              |
| B5  | −4.48296E−14  | —              |
| B6  | −1.03973E−13  | —              |
| B7  | —             | —              |
| B8  | 1.76956E−17   | —              |
| B9  | —             | —              |
| B10 | −1.11545E−21  | —              |
| *Outer side light flux (angle of incidence: 3.30°)* | | |
| RY  | −7650.000     | 1884.834       |
| K   | 0.000         | 0.000          |
| A4  | 7.00003E−08   | 3.58297E−08    |
| A6  | −3.98297E−11  | −3.61707E−11   |
| A8  | 5.48949E−15   | 4.63056E−15    |
| A10 | −2.34995E−19  | −1.78777E−19   |
| RZ  | 34.707        | ∞              |
| B1  | −1.77530E−06  | —              |
| B2  | −7.60817E−07  | —              |
| B3  | 1.63116E−09   | —              |
| B4  | 1.09690E−10   | —              |
| B5  | −1.92581E−13  | —              |
| B6  | −8.80894E−15  | —              |
| B7  | —             | —              |
| B8  | −8.15575E−19  | —              |
| B9  | —             | —              |
| B10 | 1.29750E−22   | —              |

Numerical Values of Conditional Expressions $-0.129 < Zr < -0.095$ $0.843 < Zl < 2.220$ $-21.382 < Zl/Zr < -8.027$ Specific data of the optical scanning optical system in the numerical example 2 is shown in following Tables 5 to 8.

TABLE 5

Inner side light flux (angle of incidence: 1.46°)

| Surface number    | RY (mm)   | RZ (mm) | X (m)  | N      | Remarks                     |
|-------------------|-----------|---------|--------|--------|-----------------------------|
| Deflection surface| ∞         | ∞       | —      | —      | Deflection surface          |
| 1*                | −756.000  | ∞       | 5.00   | 1.5240 | First scanning focus lens   |
| 2*                | −114.717  | ∞       | 161.00 | —      |                             |
| 3*                | −7650.000 | 35.042  | 3.00   | 1.5240 | Second scanning focus lens  |
| 4**               | 2057.754  | ∞       | 97.73  | —      |                             |
| 5                 | —         | —       | —      | —      | Surface to be scanned       |

TABLE 6

Outer side light flux (angle of incidence: 3.30°)

| Surface number    | RY (mm)   | RZ (mm) | X (m)  | N      | Remarks                     |
|-------------------|-----------|---------|--------|--------|-----------------------------|
| Deflection surface| ∞         | ∞       | —      | —      | Deflection surface          |
| 1*                | −756.000  | ∞       | 5.00   | 1.5240 | First scanning focus lens   |
| 2*                | −114.717  | ∞       | 161.00 | —      |                             |
| 3*                | −7650.000 | 34.707  | 3.00   | 1.5240 | Second scanning focus lens  |
| 4**               | 1884.834  | ∞       | 97.73  | —      |                             |
| 5                 | —         | —       | —      | —      | Surface to be scanned       |

TABLE 7

Aspherical coefficient (first scanning focus lens)

|     | First surface | Second surface |
|-----|---------------|----------------|
| RY  | −765.000      | −114.717       |
| K   | 0.000         | 0.000          |
| A4  | −5.01156E−07  | −7.83227E−08   |
| A6  | 1.91364E−09   | 1.01891E−09    |
| A8  | −4.76701E−12  | −1.81952E−12   |
| A10 | —             | −2.04692E−15   |
| RZ  | ∞             | ∞              |
| B2  | 2.62701E−04   | 2.17054E−04    |
| B4  | −1.10168E−07  | 5.59768E−08    |
| B6  | 3.82783E−10   | 1.75213E−10    |
| B8  | 3.78340E−13   | 5.24682E−13    |
| B10 | 3.17419E−16   | 4.85532E−16    |

TABLE 8

Aspherical coefficient (second scanning focus lens)

|     | Third surface | Fourth surface |
|-----|---------------|----------------|
| *Inner side light flux (angle of incidence: 1.46°)* | | |
| RY  | −7650.000     | 2075.051       |
| K   | 0.000         | 0.000          |
| A4  | 9.18081E−08   | 5.53187E−08    |
| A6  | −4.096590E−11 | −3.81282E−11   |
| A8  | 4.66231E−15   | 4.04185E−15    |
| A10 | −1.54864E−19  | −1.17933E−19   |
| RZ  | 35.030        | ∞              |

TABLE 8-continued

Aspherical coefficient (second scanning focus lens)

| | Third surface | Fourth surface |
|---|---|---|
| B1 | 9.56228E−08 | — |
| B2 | −1.29938E−07 | — |
| B3 | 6.91482E−11 | — |
| B4 | −4.30139E−10 | — |
| B5 | −5.66429E−15 | — |
| B6 | 2.06734E−13 | — |
| B7 | — | — |
| B8 | −3.69347E−17 | — |
| B9 | — | — |
| B10 | 2.21476E−21 | — |
| F1 | — | −9.59362E−07 |
| F2 | — | −2.65881E−07 |
| F3 | — | 1.35117E−11 |
| F4 | — | −5.45185E−12 |
| F5 | — | — |
| F6 | — | 1.55645E−14 |
| F7 | — | — |
| F8 | — | −3.30956E−18 |
| F9 | — | — |
| F10 | — | 2.01646E−22 |

Outer side light flux (angle of incidence: 3.30°)

| | | |
|---|---|---|
| RY | −7650.000 | 1546.911 |
| K | 0.000 | 0.000 |
| A4 | 9.10803E−08 | 5.58587E−08 |
| A6 | −4.07095E−11 | −3.86270E−11 |
| A8 | 4.63816E−15 | 4.06368E−15 |
| A10 | −1.55824E−19 | −1.17082E−19 |
| RZ | 34.892 | ∞ |
| B1 | 1.55804E−06 | — |
| B2 | −2.98012E−07 | — |
| B3 | −1.20640E−10 | — |
| B4 | −3.67932E−10 | — |
| B5 | −1.80575E−14 | — |
| B6 | 1.96179E−13 | — |
| B7 | — | — |
| B8 | −3.62621E−17 | — |
| B9 | — | — |
| B10 | 2.21562E−21 | — |
| F1 | — | −1.17782E−06 |
| F2 | — | −5.70459E−07 |
| F3 | — | −1.77030E−10 |
| F4 | — | −6.48231E−11 |
| F5 | — | — |
| F6 | — | 5.69115E−14 |
| F7 | — | — |
| F8 | — | −1.14512E−17 |
| F9 | — | — |
| F10 | — | 7.19535E−22 |

Figure 12A:
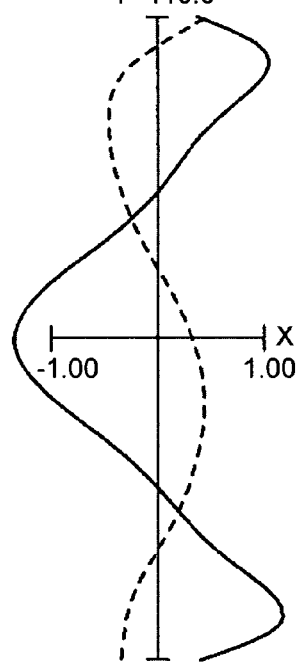
FIG. 12A is an aberration curve diagram of an inner side light flux in a numerical example 1 in which image surface curves in a main scanning direction and a sub-scanning direction are shown.
Figure 12B:
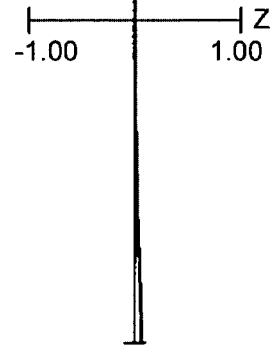
FIG. 12B is an aberration curve diagram of the inner side light flux in the numerical example 1 in which a scanning line curve is shown.
Figure 12C:
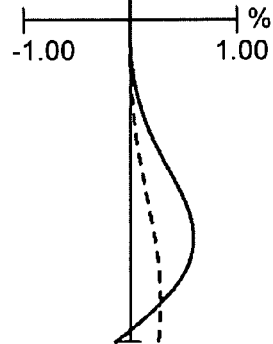
FIG. 12C is an aberration curve diagram of the inner side light flux in the numerical example 1 in which an fθ characteristic and linearity are shown.
Figure 13A:
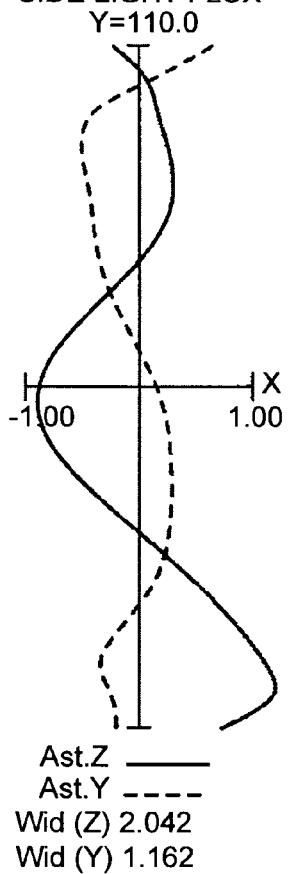
FIG. 13A is an aberration curve diagram of an outer side light flux in the numerical example 1 in which image surface curves in a main scanning direction and a sub-scanning direction are shown.
Figure 13B:
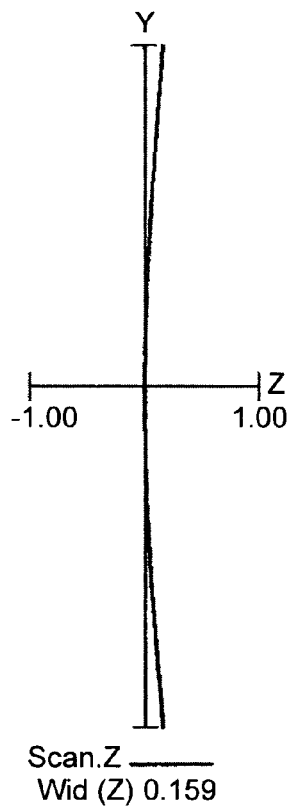
FIG. 13B is an aberration curve diagram of the outer side light flux in the numerical example 1 in which a scanning line curve is shown.
Figure 13C:
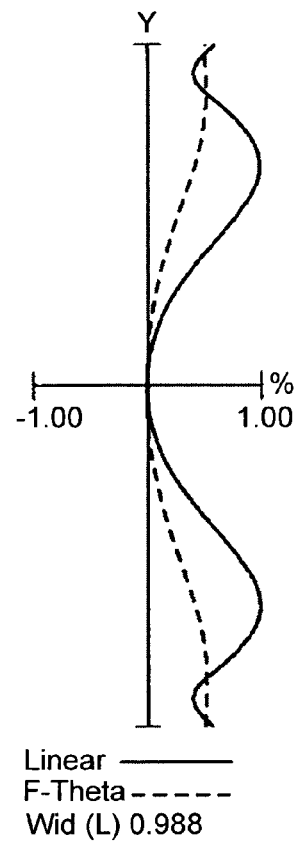
FIG. 13C is an aberration curve diagram of the outer side light flux in the numerical example 1 in which an fθ characteristic and linearity are shown.
Figure 14A:
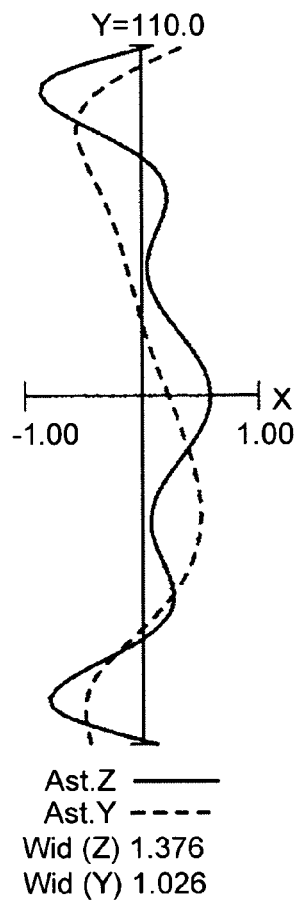
FIG. 14A is an aberration curve diagram of an inner side light flux in a numerical example 2 in which image surface curves in a main scanning direction and a sub-scanning direction are shown.
Figure 14B:
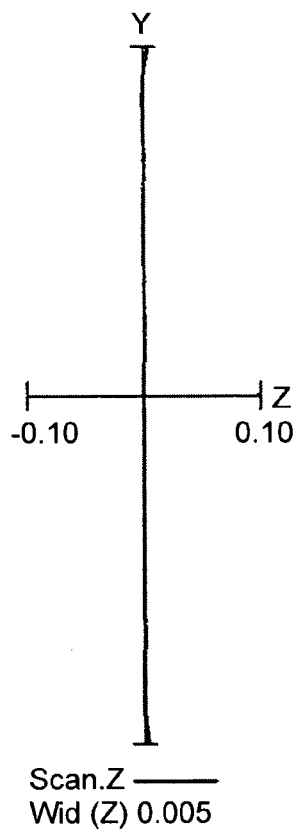
FIG. 14B is an aberration curve diagram of the inner side light flux in the numerical example 2 in which a scanning line curve is shown.
Figure 14C:
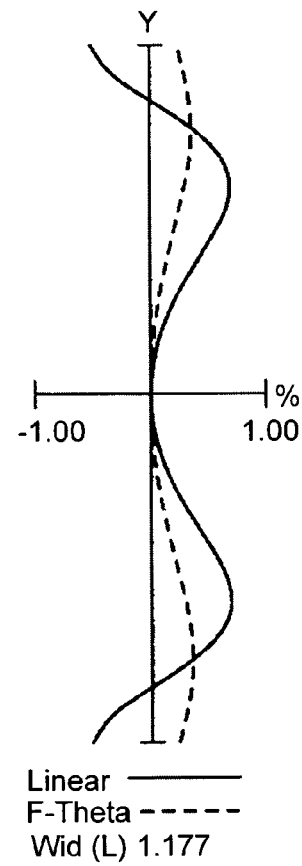
FIG. 14C is an aberration curve diagram of the inner side light flux in the numerical example 2 in which an fθ characteristic and linearity are shown.
Figure 15A:
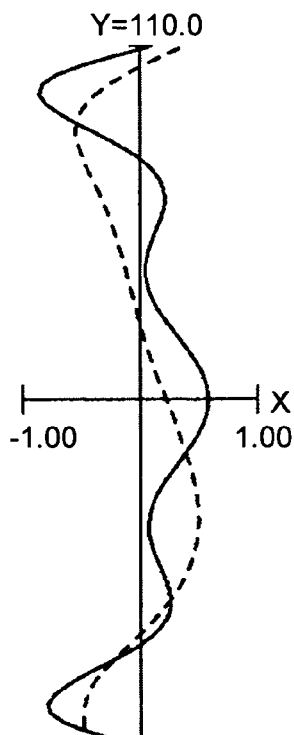
FIG. 15A is an aberration curve diagram of an outer side light flux in the numerical example 2 in which image surface curves in a main scanning direction and a sub-scanning direction are shown.
Figure 15B:
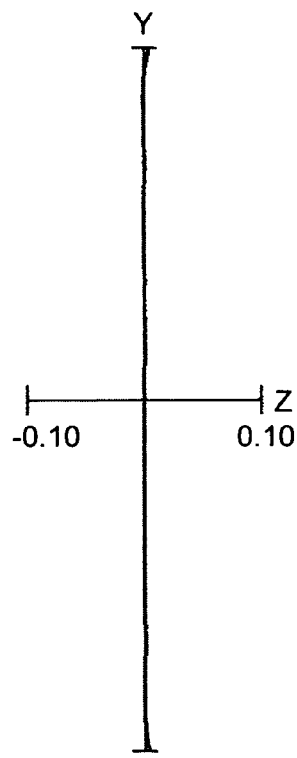
FIG. 15B is an aberration curve diagram of the outer side light flux in the numerical example 2 in which a scanning line curve is shown.
Figure 15C:
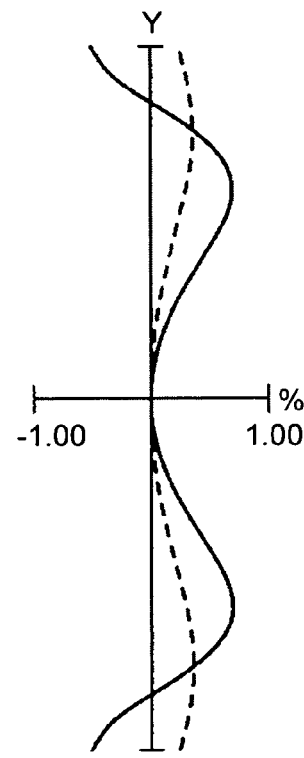
FIG. 15C is an aberration curve diagram of the outer side light flux in the numerical example 2 in which an fθ characteristic and linearity are shown.

Numerical Values of Conditional Expressions $-0.129 < Zr < -0.097$ $0.843 < Zl < 2.034$ $-21.382 < Zl/Zr < -8.027$ The specific numerical examples 1 and 2 of the optical scanning device according to the present invention are described above. FIGS. 12A to 12C to FIGS. 15A to 15C are diagrams of optical characteristics in the numerical examples 1 and 2. FIGS. 12A to 12C are aberration curve diagrams of an inner side light flux in the numerical example 1. FIGS. 13A to 13C are aberration curve diagrams of an outer side light flux in the numerical example 1. FIGS. 14A to 14C are aberration curve diagrams of an inner side light flux in the numerical example 2. FIGS. 15A to 15C are aberration curve diagrams of an outer side light flux in the numerical example 2. FIGS. 12A, 13A, 14A, and 15A are diagrams of image surface curves in the main scanning direction and the sub-scanning direction. FIGS. 12B, 13B, 14B, and 15B are diagrams of scanning line curves. FIGS. 12C, 13C, 14C, and 15C are diagrams of fθ characteristics and linearity. As it is evident from these figures, optical performance is satisfactorily corrected in the optical scanning device in this embodiment.

Figure 16:
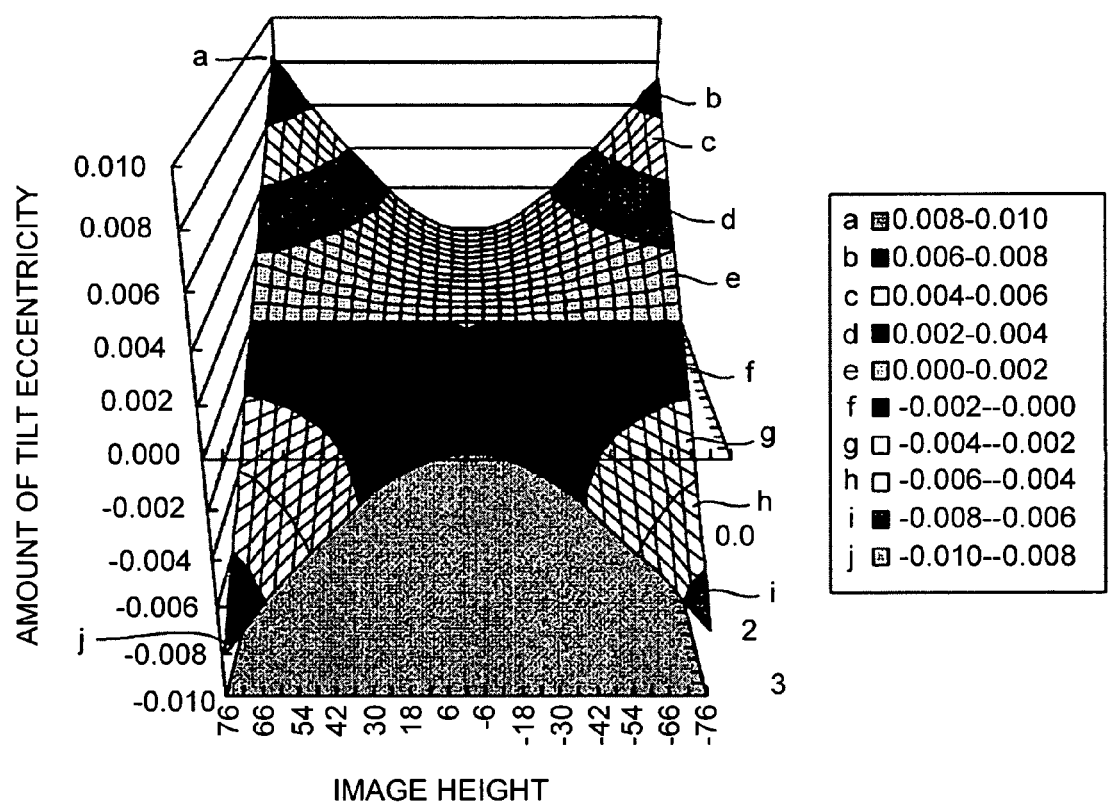
FIG. 16 is a conceptual diagram of a tilt decentered surface of a scanning focus lens.

FIG. 16 is a conceptual diagram of a tilt decentered surface of a scanning focus lens. In the figure, an abscissa represents an image height and an ordinate represents a tilt amount of eccentricity.

The optical scanning device of the present invention adopts the oblique incidence system in which all light beams from a plurality of light source devices have angles in the sub-scanning direction with respect to the normal of the reflection surface of the light deflector. Thus, it is possible to realize an optical scanning device suitable for a reduction in cost, a reduction in power consumption, and a reduction in size. In the optical scanning device, it is possible to constitute a polyhedron forming the deflective reflection surface of the light deflector with one stage and reduce thickness in the sub-scanning direction thereof. It is possible to reduce cost of the light deflector that has a high cost ratio among components of the optical scanning device and reduce power consumption and noise taking into account the environment. In the present invention, any one of the constitutions according to the first to the seventeenth aspects is adopted as a constitution of the optical scanning device. Thus, even in the oblique incidence system in which light beams from a plurality of light source devices have angles in the sub-scanning direction with respect to the normal of the deflective reflection surface of the light deflector, it is possible to effectively correct a scanning line curve and deterioration in a wavefront aberration in the optical scanning device of the oblique incidence system using the scanning focus lens of the optical scanning optical system. Therefore, according to the present invention, it is possible to realize an optical scanning device that can cope with high speed and high density and reduce color drift in a full color machine. It is possible to realize an increase in speed and an increase in density using the optical scanning device. Moreover, it is possible to realize an image forming apparatus that has less occurrence of color drift even when temperature fluctuates.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device, comprising:
    a light deflector configured to deflect light beams from at least one of a plurality of light source devices in a main scanning direction; and
    at least one scanning focus lens having a surface with a curvature in a sub-scanning direction that is orthogonal to the main scanning direction, such that the curvature changes in such a way as to increase negative power over an entirety of the surface as an image height increases, the curvature being either one of zero and substantially zero on a reference axis of the at least one scanning focus lens, wherein
    the light beams are made incident on a deflective reflection surface of the light deflector at an angle in a sub-scanning direction with respect to a normal of the deflective reflection surface, and
    the optical scanning device is configured to focus the light beams deflected by the light deflector on a surface to be scanned, and wherein the at least one scanning focus lens is disposed closer to the light deflector than another scanning focus lens having a largest refracting power in the sub-scanning direction.

2. The optical scanning device according to claim 1, wherein
light beams from the plurality of light source devices are deflected by a common light deflector, and
at least two light beams pass through a scanning focus lens closest to the light deflector.

3. The optical scanning device according to claim 1, wherein
light beams from the plurality of light source devices are deflected by a common light deflector, and
all the light beams deflected by the light deflector pass through a scanning focus lens closest to the light deflector.

4. The optical scanning device according to claim 1, wherein the at least one scanning focus lens includes
a surface not having a curvature in the sub-scanning direction, and
at least one tilt decentered surface with an angle of tilt eccentricity in the sub-scanning direction, such that the angle of tilt eccentricity changes according to the image height.

5. The optical scanning device according to claim 4, wherein an amount of tilt on a reference axis of the at least one tilt decentered surface is substantially zero.

6. The optical scanning device according to claim 4, wherein an amount of tilt of the at least one tilt decentered surface increases with a distance from the reference axis of the at least one tilt decentered surface.

7. The optical scanning device according to claim 4, wherein the at least one tilt decentered surface is on a scanning focus lens closest to the surface to be scanned.

8. The optical scanning device according to claim 1, further comprising at least one surface having a curvature that is different depending upon the image height, on a scanning focus lens closest to the surface to be scanned.

9. The optical scanning device according to claim 8, further comprising at least one surface having a curvature in the sub-scanning direction that changes asymmetrically with a reference axis in a main scanning direction as a center.

10. The optical scanning device according to claim 1, wherein a reflection point on the light deflector and an incidence point on a scanning focus lens closest to the light deflector are present on opposite sides to each other with respect to a plane that includes a reference axis of the scanning focus lens and that is orthogonal to a rotation axis of the light deflector.

11. The optical scanning device according to claim 10, wherein
a distance from the plane to the incidence point is Zl,
a distance from the plane to the reflection point is Zr, and
−25.0<Zl/Zr<−7.0.

12. The optical scanning device according to claim 1, wherein the curvature monotonically increases from the reference axis with the image height.

13. An optical scanning device, comprising:
a light deflector configured to deflect light beams from at least one of a plurality of light source devices in a main scanning direction, wherein
the optical scanning device is configured to focus the light beams deflected by the light deflector on a surface to be scanned,
the light beams are made incident on a deflective reflection surface of the light deflector at an angle in a sub-scanning direction with respect to a normal of the deflective reflection surface, said sub-scanning direction being orthogonal to the main scanning direction, and
a curvature in the sub-scanning direction of a scanning focus lens closest to the light deflector changes according to an image height such that a negative power in the sub-scanning direction in a plane that includes the deflected light beams and that is parallel to the sub-scanning direction increases over an entirety of the scanning focus lens as the image height increases.

14. The optical scanning device according to claim 13, wherein
at least one lens surface of the scanning focus lens has a curvature in the sub-scanning direction that is either one of zero and substantially zero on a reference axis, and
the curvature of the at least one lens surface changes according to the image height such that the negative power increases as the image height increases.

15. The optical scanning device according to claim 13, wherein the curvature monotonically increases with the image height.

16. An optical scanning device, comprising:
a light deflector configured to deflect light beams from at least one of a plurality of light source devices in a main scanning direction, wherein
the optical scanning device is configured to focus the light beams deflected by the light deflector on a surface to be scanned,
the light beams are made incident on a deflective reflection surface of the light deflector at an angle in a sub-scanning direction with respect to a normal of the deflective reflection surface, said sub-scanning direction being orthogonal to the main scanning direction, and
a curvature in the sub-scanning direction of a scanning focus lens closest to the light deflector changes according to an image height such that, over an entirety of the scanning focus lens, light is emitted farther apart from a reference axis with respect to the sub-scanning direction as the image height increases.

17. The optical scanning device according to claim 16, wherein
at least one lens surface of the scanning focus lens has a curvature in the sub-scanning direction that is either one of zero and substantially zero on the reference axis, and
the curvature of the at least one lens surface changes according to the image height such that a negative power in the sub-scanning direction in a plane that includes the deflected light beams and that is parallel to the sub-scanning direction increases as the image height increases.

18. The optical scanning device according to claim 16, wherein the curvature monotonically increases from the reference axis with the image height.

19. A multi-beam optical scanning device, comprising:
a multi-beam light source device configured to emit a plurality of light beams; and
a light beam scanning unit configured to focus the light beams from the multi-beam light source device on a surface to be scanned, the light beam scanning unit including
a light deflector configured to deflect the light beams in a main scanning direction, and
at least one scanning focus lens having at least one lens surface with a curvature in a sub-scanning direction that is orthogonal to the main scanning direction, such that the curvature changes in such a way as to increase negative power over an entirety of the at least one lens surface as an image height increases, the curvature being either one of zero and substantially zero on a reference axis of the at least one scanning focus lens, wherein the light beams are made incident on a deflective reflection surface of the light deflector at an angle in the sub-scanning direction with respect to a normal of the deflective reflection surface, and wherein the at least one scanning focus lens is disposed closer to the light deflector than another scanning focus lens having a largest refracting power in the sub-scanning direction.

20. A multi-beam optical scanning device, comprising:
a multi-beam light source device configured to emit a plurality of light beams; and
a light beam scanning unit configured to focus the light beams from the multi-beam light source device on a surface to be scanned, the light beam scanning unit including a light deflector configured to deflect the light beams in a main scanning direction, wherein
the light beams are made incident on a deflective reflection surface of the light deflector at an angle in a sub-scanning direction with respect to a normal of the deflective reflection surface, said sub-scanning direction being orthogonal to the main scanning direction, and
a curvature in the sub-scanning direction of a scanning focus lens closest to the light deflector changes according to an image height such that a negative power in the sub-scanning direction in a plane that includes the deflected light beams and that is parallel to the sub-scanning direction increases over an entirety of the scanning focus lens as the image height increases.

21. A multi-beam optical scanning device, comprising:
a multi-beam light source device configured to emit a plurality of light beams; and
a light beam scanning unit configured to focus the light beams from the multi-beam light source device on a surface to be scanned, the light beam scanning unit including a light deflector configured to deflect the light beams in a main scanning direction,
wherein the light beams are made incident on a deflective reflection surface of the light deflector at an angle in a sub-scanning direction with respect to a normal of the deflective reflection surface, said sub-scanning direction being orthogonal to the main scanning direction, and
a curvature in the sub-scanning direction of a scanning focus lens closest to the light deflector changes according to an image height such that, over an entirety of the scanning focus lens, light is emitted farther apart from a reference axis with respect to the sub-scanning direction as the image height increases.

22. An image forming apparatus, comprising:
a writing unit configured to write a latent image on a photosensitive member serving as a surface to be scanned, the writing unit including
a light deflector configured to deflect light beams from at least one of a plurality of light source devices in a main scanning direction, and
at least one scanning focus lens having at least one lens surface with a curvature in a sub-scanning direction that is orthogonal to the main scanning direction, such that the curvature changes in such a way as to increase negative power over an entirety of the at least one lens surface as an image height increases, the curvature being either one of zero and substantially zero on a reference axis of the at least one scanning focus lens, wherein
the writing unit is configured to focus the deflected light beams on a surface to be scanned,
the light beams are made incident on a deflective reflection surface of the light deflector at an angle in the sub-scanning direction with respect to a normal of the deflective reflection surface, and wherein
the at least one scanning focus lens is disposed closer to the light deflector than another scanning focus lens having a largest refracting power in the sub-scanning direction.

23. An image forming apparatus, comprising:
a writing unit configured to write a latent image on a photosensitive member serving as a surface to be scanned, the writing unit including a light deflector configured to deflect light beams from at least one of a plurality of light source devices in a main scanning direction, wherein
the writing unit is configured to focus the light beams deflected by the light deflector on the surface,
the light beams are made incident on a deflective reflection surface of the light deflector at an angle in a sub-scanning direction with respect to a normal of the deflective reflection surface, said sub-scanning direction being orthogonal to the main scanning direction, and
a curvature in the sub-scanning direction of a scanning focus lens closest to the light deflector changes according to an image height such that a negative power in the sub-scanning direction in a plane that includes the deflected light beams and is parallel to the sub-scanning direction increases over an entirety of the scanning focus lens as the image height increases.

24. An image forming apparatus, comprising:
a writing unit configured to write a latent image on a photosensitive member serving as a surface to be scanned, the writing unit including a light deflector configured to deflect light beams from at least one of a plurality of light source devices in a main scanning direction, wherein
the optical scanning device is configured to focus the light beams deflected by the light deflector on the surface,
the light beams are made incident on a deflective reflection surface of the light deflector at an angle in a sub-scanning direction with respect to a normal of the deflective reflection surface, said sub-scanning direction being orthogonal to the main scanning direction, and
a curvature in the sub-scanning direction of a scanning focus lens closest to the light deflector changes according to an image height such that, over an entirety of the scanning focus lens, light is emitted farther apart from a reference axis with respect to the sub-scanning direction as the image height increases.

25. An image forming apparatus, comprising:
a multi-beam optical scanning device including
a multi-beam light source device configured to emit a plurality of light beams, and
a light beam scanning unit configured to focus the light beams from the multi-beam light source device on a surface to be scanned; and
a writing unit configured to write a latent image on a photosensitive member serving as the surface to be scanned, the writing unit including
a light deflector configured to deflect the light beams from at least one of a plurality of light source devices in a main scanning direction, and
at least one scanning focus lens having at least one lens surface with a curvature in a sub-scanning direction that is orthogonal to the main scanning direction, such that the curvature changes in such a way as to increase negative power over an entirety of the at least one lens surface as an image height increases, the curvature being either one of zero and substantially zero on a reference axis of the at least one scanning focus lens, wherein the optical scanning device is configured to focus the light beams deflected by the light deflector on the surface, the light beams are made incident on a deflective reflection surface of the light deflector at an angle in the sub-scanning direction with respect to a normal of the deflective reflection surface, and wherein the at least one scanning focus lens is disposed closer to the light deflector than another scanning focus lens having a largest refracting power in the sub-scanning direction.

* * * * *